US012027085B2

(12) United States Patent
Han et al.

(10) Patent No.: US 12,027,085 B2
(45) Date of Patent: Jul. 2, 2024

(54) SAMPLING CIRCUIT AND DRIVING METHOD THEREOF, PIXEL SAMPLING CIRCUIT, AND DISPLAY APPARATUS

(71) Applicant: BOE TECHNOLOGY GROUP CO., LTD., Beijing (CN)

(72) Inventors: Xinbin Han, Beijing (CN); Xinshe Yin, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/015,394

(22) PCT Filed: Nov. 18, 2021

(86) PCT No.: PCT/CN2021/131519
§ 371 (c)(1),
(2) Date: Jan. 10, 2023

(87) PCT Pub. No.: WO2022/237111
PCT Pub. Date: Nov. 17, 2022

(65) Prior Publication Data

US 2023/0343256 A1 Oct. 26, 2023

(30) Foreign Application Priority Data

May 10, 2021 (CN) ......................... 202110506648.6

(51) Int. Cl.
*G09G 3/20* (2006.01)
*G09G 3/00* (2006.01)
(Continued)

(52) U.S. Cl.
CPC ........... *G09G 3/006* (2013.01); *G09G 3/2092* (2013.01); *G09G 3/3208* (2013.01); (Continued)

(58) Field of Classification Search
CPC .... G09G 3/006; G09G 3/2092; G09G 3/3208; G09G 2310/08; G09G 2330/12;
(Continued)

(56) References Cited

U.S. PATENT DOCUMENTS 7,285,964 B1 10/2007 Hsu et al.
2003/0094930 A1 5/2003 Pierre et al.
(Continued)

FOREIGN PATENT DOCUMENTS

CN 101621292 A 1/2010
CN 102298407 A 12/2011
(Continued)

OTHER PUBLICATIONS

The First Office Action for the Chinese Patent Application No. 202110506648.6 issued by the Chinese Patent Office on Jan. 26, 2022.

(Continued)

*Primary Examiner* — Douglas M Wilson
(74) *Attorney, Agent, or Firm* — IP & T GROUP LLP

(57) ABSTRACT

A sampling circuit includes: a first input terminal, a second input terminal, a first voltage acquisition sub-circuit, and a current integrating sub-circuit. The first voltage acquisition sub-circuit is coupled to the first input terminal and the current integrating sub-circuit, and is configured to acquire a first voltage of the first input terminal and transmit the first voltage to the current integrating sub-circuit. The current integrating sub-circuit is further coupled to the second input terminal, and is configured to, generate and output a second voltage according to the first voltage and an integral of a driving current transmitted to the current integrating sub-circuit through the second input terminal over time, and output the first voltage in response to an integral control signal received by the current integrating sub-circuit.

17 Claims, 16 Drawing Sheets

(51) Int. Cl.
*G09G 3/3208* (2016.01)
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2310/0294* (2013.01); *G09G 2310/08* (2013.01); *G09G 2320/02* (2013.01); *G09G 2320/0233* (2013.01); *G09G 2320/0295* (2013.01); *G09G 2320/045* (2013.01)

(58) Field of Classification Search
CPC ......... G09G 2320/0295; G09G 3/3233; G09G 3/3291; G09G 2310/0294; G09G 2320/02; G09G 2320/0233; G09G 2320/045
See application file for complete search history.

(56) References Cited

U.S. PATENT DOCUMENTS

| | | | |
|---|---|---|---|
| 2006/0279321 | A1 | 12/2006 | Ruppender et al. |
| 2006/0284576 | A1 | 12/2006 | Le et al. |
| 2008/0251721 | A1 | 10/2008 | Ueno |
| 2010/0033511 | A1 | 2/2010 | Yamashita et al. |
| 2010/0289734 | A1 | 11/2010 | Wu et al. |
| 2015/0379909 | A1 | 12/2015 | Yu et al. |
| 2016/0379553 | A1 | 12/2016 | Cho et al. |
| 2017/0039939 | A1 | 2/2017 | Chaji |
| 2017/0154573 | A1 | 6/2017 | Woo et al. |
| 2017/0256199 | A1 | 9/2017 | Bi et al. |
| 2017/0294159 | A1 | 10/2017 | Lee et al. |
| 2018/0061913 | A1 | 3/2018 | Kim et al. |
| 2018/0137819 | A1 | 5/2018 | An et al. |
| 2018/0226006 | A1 | 8/2018 | Wang et al. |
| 2019/0272785 | A1 | 9/2019 | Qian |
| 2020/0175919 | A1 | 6/2020 | Hong et al. |
| 2020/0183539 | A1 | 6/2020 | Kang et al. |
| 2020/0184175 | A1 | 6/2020 | Suwald et al. |
| 2021/0043148 | A1* | 2/2021 | Lee ...................... G09G 3/3291 |
| 2021/0407435 | A1 | 12/2021 | Tang et al. |
| 2022/0005412 | A1 | 1/2022 | Xie |
| 2022/0366850 | A1* | 11/2022 | Ji ......................... G09G 3/3275 |
| 2023/0042060 | A1 | 2/2023 | Wang et al. |

FOREIGN PATENT DOCUMENTS

| | | | |
|---|---|---|---|
| CN | 103384313 | A | 11/2013 |
| CN | 203616605 | U | 5/2014 |
| CN | 105548666 | A | 5/2016 |
| CN | 106531041 | A | 3/2017 |
| CN | 106557724 | A | 4/2017 |
| CN | 206440802 | U | 8/2017 |
| CN | 107526993 | A | 12/2017 |
| CN | 207020243 | U | 2/2018 |
| CN | 107924660 | A | 4/2018 |
| CN | 107945722 | A | 4/2018 |
| CN | 108074524 | A | 5/2018 |
| CN | 109342797 | A | 2/2019 |
| CN | 109951925 | A | 6/2019 |
| CN | 110164362 | A | 8/2019 |
| CN | 110503920 | A | 11/2019 |
| CN | 111243507 | A | 6/2020 |
| CN | 111273088 | A | 6/2020 |
| CN | 111290654 | A | 6/2020 |
| CN | 111583872 | A | 8/2020 |
| CN | 112331113 | A | 2/2021 |
| CN | 113257184 | A | 8/2021 |
| CN | 113362763 | A | 9/2021 |
| JP | 2008-258973 | A | 10/2008 |
| KR | 10-2017-0064640 | A | 6/2017 |
| KR | 10-2017-0116293 | A | 10/2017 |
| KR | 10-2018-0053131 | A | 5/2018 |
| TW | 200701174 | A | 1/2007 |

OTHER PUBLICATIONS

The Second Office Action for the Chinese Patent Application No. 202110506648.6 issued by the Chinese Patent Office on Apr. 13, 2022.

Notification to Grant Patent Right for Invention for the Chinese Patent Application No. 202110506648.6 issued by the Chinese Patent Office on Jul. 22, 2022.

* cited by examiner

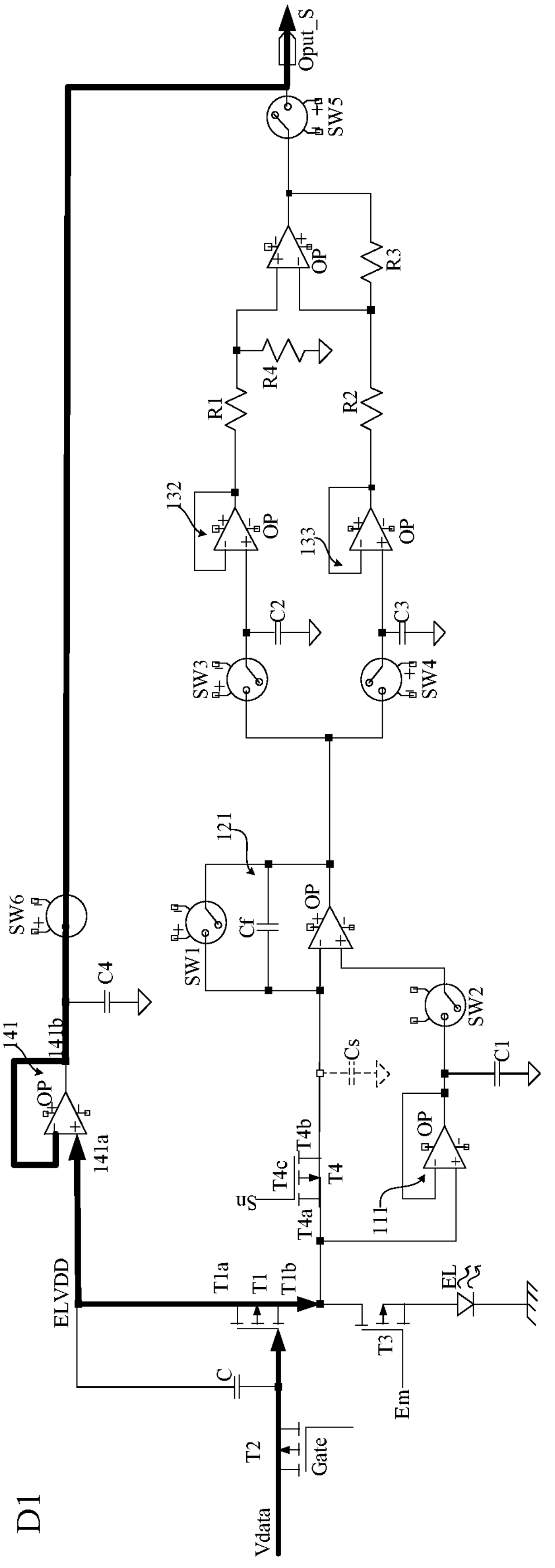
FIG. 10A(1)

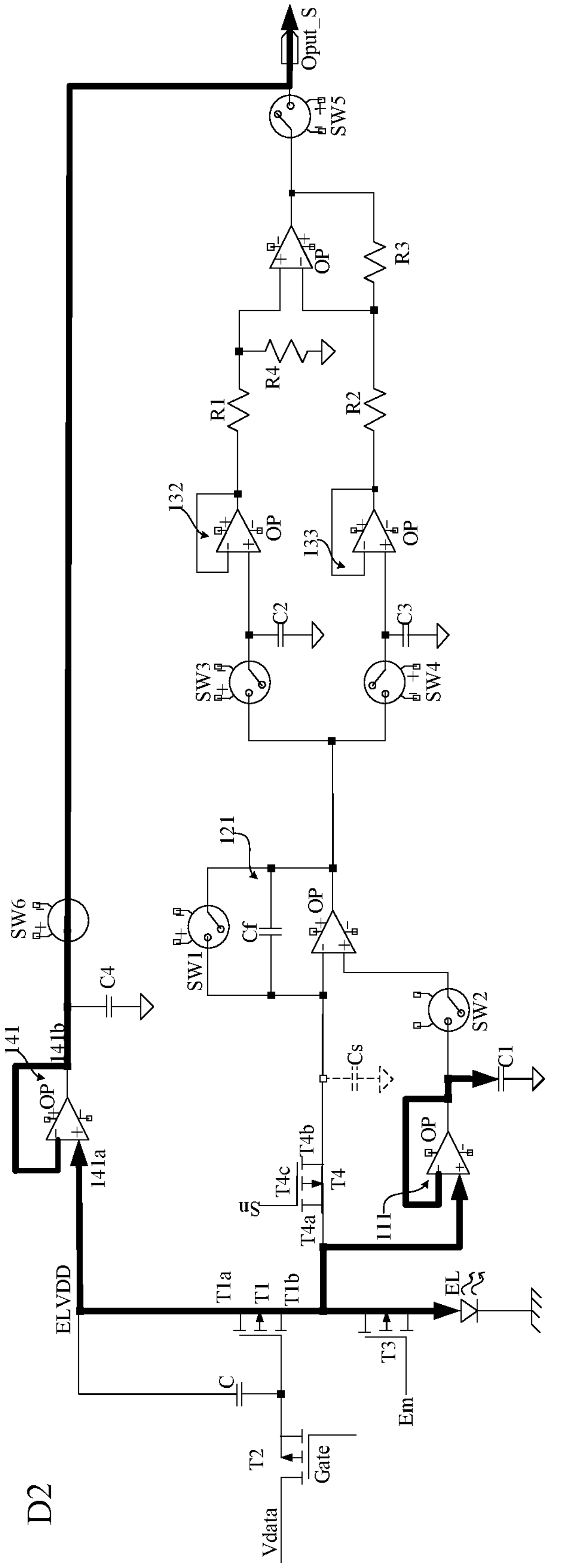
FIG. 10A(2)

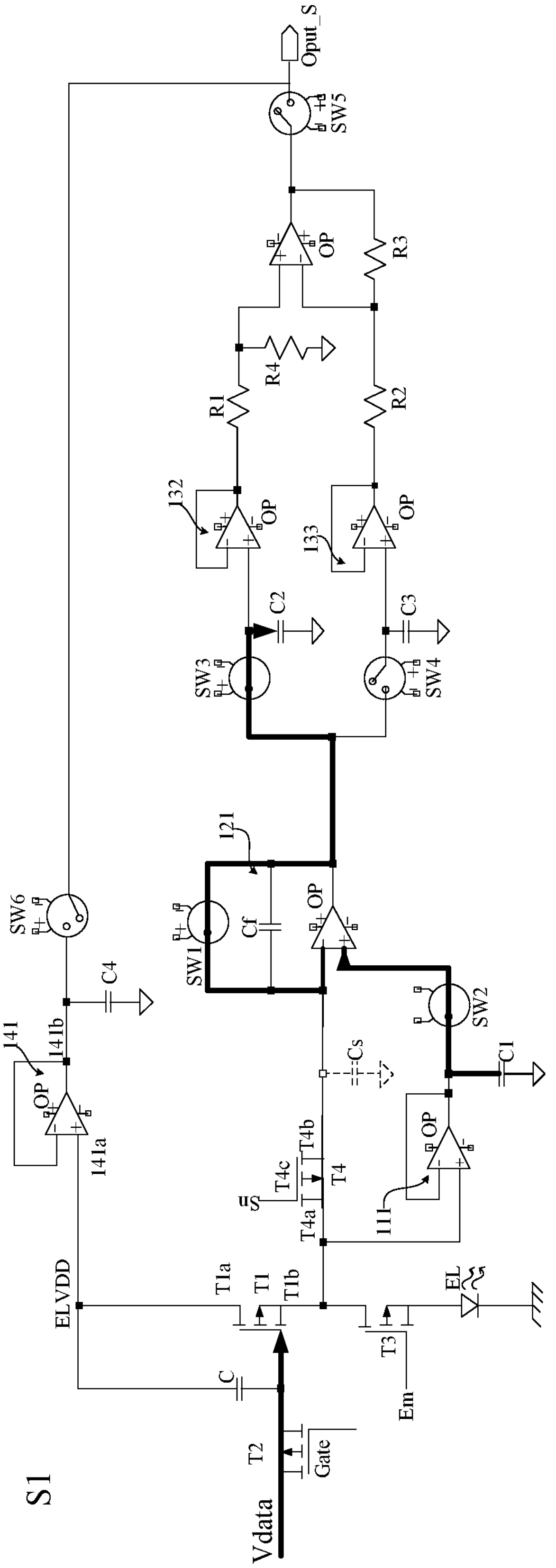
FIG. 10B(1)

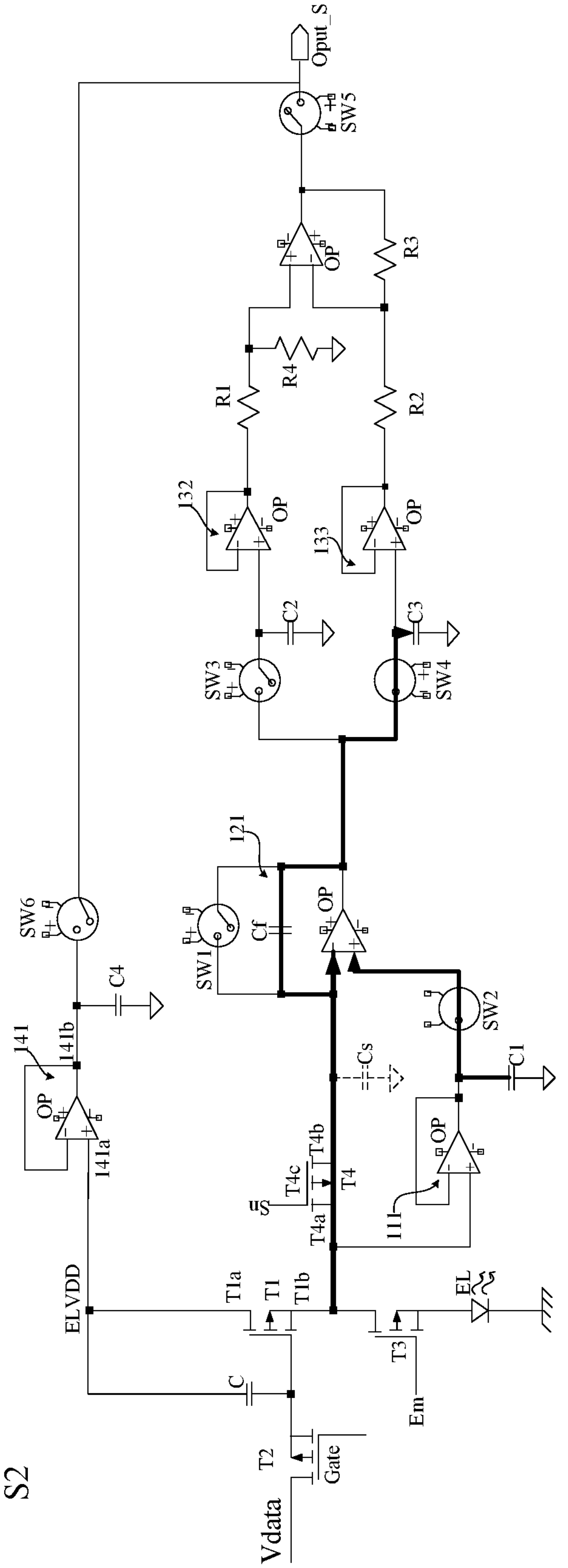
FIG. 10B(2)

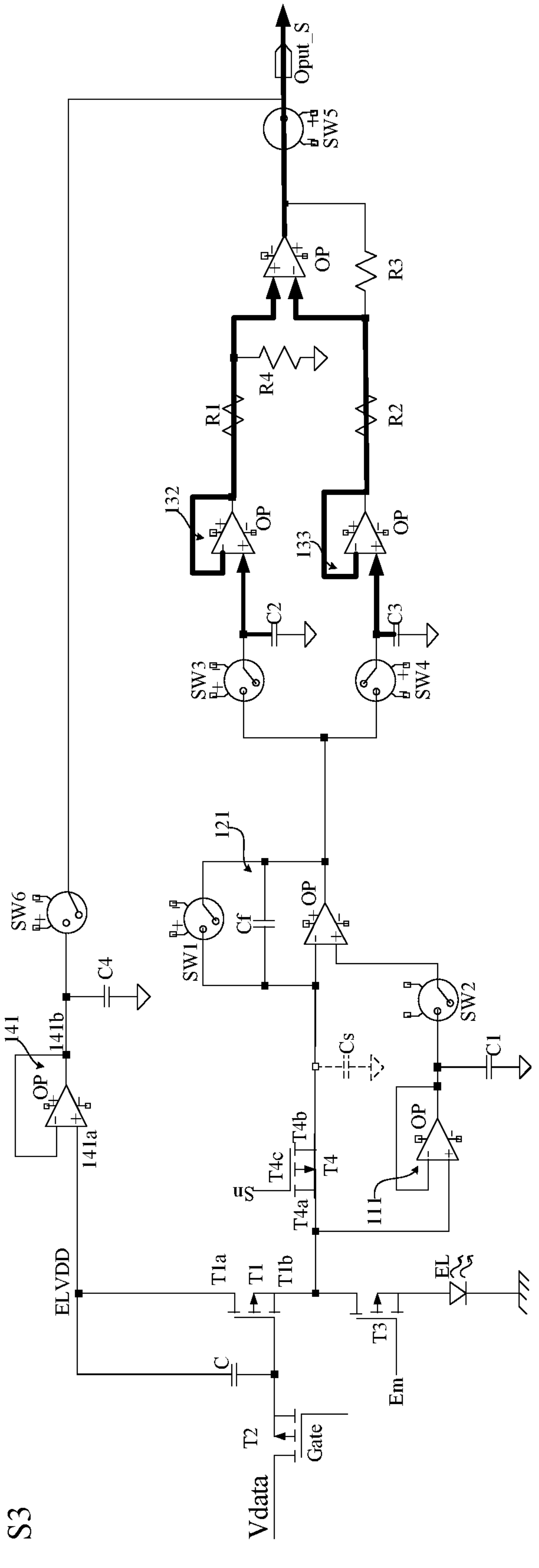
FIG. 10B(3)

SAMPLING CIRCUIT AND DRIVING METHOD THEREOF, PIXEL SAMPLING CIRCUIT, AND DISPLAY APPARATUS

CROSS-REFERENCE TO RELATED APPLICATIONS

This application is a national phase entry under 35 USC 371 of International Patent Application No. PCT/CN2021/131519, filed on Nov. 18, 2021, which claims priority to Chinese Patent Application No. 202110506648.6, filed on May 10, 2021, which are incorporated herein by reference in their entirety.

TECHNICAL FIELD

The present disclosure relates to the field of display technologies, and in particular, to a sampling circuit and a driving method thereof, a pixel sampling circuit and a display apparatus.

BACKGROUND

Self-luminescent display apparatuses such as organic light-emitting diode (OLED) display panels have self-luminescence, wide viewing angle, high contrast, low power consumption, good color reproduction, sensitive response, and other advantages and have broad development prospects.

SUMMARY

In a first aspect, a sampling circuit is provided. The sampling circuit includes: a first input terminal, a second input terminal, a first voltage acquisition sub-circuit and a current integrating sub-circuit.

The first voltage acquisition sub-circuit is coupled to the first input terminal and the current integrating sub-circuit, and is configured to acquire a first voltage of the first input terminal and transmit the first voltage to the current integrating sub-circuit. The current integrating sub-circuit is further coupled to the second input terminal, and is configured to, generate and output a second voltage according to the first voltage and an integral of a driving current transmitted to the current integrating sub-circuit through the second input terminal over time, and output the first voltage in response to an integral control signal received by the current integrating sub-circuit.

In some embodiments, the second input terminal is configured to be coupled to the first input terminal.

In some embodiments, the first voltage acquisition sub-circuit includes a first voltage follower, and an input terminal of the first voltage follower is coupled to the first input terminal. And/or the current integrating sub-circuit includes an integrator and a first switching device; the integrator includes: a non-inverting input terminal and an inverting input terminal, the non-inverting input terminal of the integrator is coupled to the first voltage acquisition sub-circuit, and the inverting input terminal of the integrator is coupled to the second input terminal; and the first switching device is connected in parallel between the non-inverting input terminal of the integrator and the inverting input terminal of the integrator, and is configured to be closed in response to the received integral control signal.

In some embodiments, the first voltage acquisition sub-circuit further includes: a first capacitor and a second switching device; a first electrode plate of the first capacitor is coupled to an output terminal of the first voltage follower, and a second electrode plate of the first capacitor is grounded; and the second switching device is coupled between the first electrode plate of the first capacitor and the current integrating sub-circuit.

In some embodiments, the sampling circuit further includes a differencing sub-circuit, and the differencing sub-circuit is coupled to the current integrating sub-circuit, and is configured to obtain a difference between the first voltage and the second voltage to obtain a third voltage.

In some embodiments, the differencing sub-circuit includes: a subtractor, a second voltage follower and a third voltage follower; the subtractor includes a non-inverting input terminal, an inverting input terminal and an output terminal; an input terminal of the second voltage follower is coupled to the current integrating sub-circuit, and an output terminal of the second voltage follower is coupled to the non-inverting input terminal of the subtractor; and an input terminal of the third voltage follower is coupled to the current integrating sub-circuit, and an output terminal of the third voltage follower is coupled to the inverting input terminal of the subtractor.

In some embodiments, the current integrating sub-circuit includes a voltage output terminal, and the current integrating sub-circuit is configured to output the first voltage and the second voltage through the voltage output terminal; and the differencing sub-circuit further includes a storage sub-circuit, and the storage sub-circuit is coupled to the voltage output terminal of the current integrating sub-circuit, and is configured to, store the received first voltage in response to a third control signal received by the differencing sub-circuit, and store the second voltage in response to a fourth control signal received by the differencing sub-circuit.

In some embodiments, the storage sub-circuit includes: a second capacitor, a third capacitor, a third switching device and a fourth switching device; a second electrode plate of the second capacitor is grounded; a second electrode plate of the third capacitor is grounded; the third switching device is coupled between the voltage output terminal and a first electrode plate of the second capacitor; and the fourth switching device is coupled between the voltage output terminal and a first electrode plate of the third capacitor.

In some embodiments, the sampling circuit further includes: a sampling output terminal and a fifth switching device. The fifth switching device is coupled between the differencing sub-circuit and the sampling output terminal.

In some embodiments, the sampling circuit further includes: a third input terminal and a second voltage acquisition sub-circuit, and the second voltage acquisition sub-circuit is coupled to the third input terminal, and is configured to acquire and output a fourth voltage provided by the third input terminal.

In some embodiments, the second voltage acquisition sub-circuit includes: a fourth voltage follower and a fourth capacitor; an input terminal of the fourth voltage follower is coupled to the third input terminal; and a first electrode plate of the fourth capacitor is coupled to an output terminal of the fourth voltage follower, and a second electrode plate of the fourth capacitor is grounded.

In some embodiments, the sampling circuit further includes: a sampling output terminal. The second voltage acquisition sub-circuit further includes a sixth switching device, and the sixth switching device is coupled between the first electrode plate of the fourth capacitor and the sampling output terminal.

In a second aspect, a pixel sampling circuit is provided. The pixel sampling circuit includes: the sampling circuit described in any one of the above embodiments and a pixel driving circuit. The pixel driving circuit includes a driving transistor, and the driving transistor includes a first electrode, a second electrode and a control electrode.

The pixel driving circuit is configured to, transmit a driving current flowing through the first electrode and the second electrode of the driving transistor to the second input terminal of the sampling circuit, and transmit a voltage of the second electrode of the driving transistor to the first input terminal of the sampling circuit.

In some embodiments, the pixel driving circuit further includes at least one of a sensing transistor or a voltage terminal. A control electrode of the sensing transistor is coupled to a scan signal terminal, a first electrode of the sensing transistor is coupled to the first input terminal, and a second electrode of the sensing transistor is coupled to the second input terminal.

The pixel driving circuit is further configured to transmit a voltage of the voltage terminal to the third input terminal of the sampling circuit.

In a third aspect, a display apparatus is provided. The display apparatus includes the sampling circuit described in any one of the above embodiments, or the pixel sampling circuit described in any one of the above embodiments.

In some embodiments, the display apparatus further includes a processor. The processor is coupled to the sampling circuit, and is configured to calculate the driving current according to a difference between the first voltage and the second voltage.

In a fourth aspect, another display apparatus is provided. The display apparatus includes the pixel sampling circuit described in any one of the above embodiments.

In some embodiments, the display apparatus further includes a processor. The processor is coupled to the pixel sampling circuit, and is configured to calculate the driving current according to a difference between the first voltage and the second voltage.

In a fifth aspect, a driving method of a sampling circuit is provided. The sampling circuit includes: a first input terminal, a second input terminal, a first voltage acquisition sub-circuit, and a current integrating sub-circuit; and the first voltage acquisition sub-circuit is coupled to the first input terminal and the current integrating sub-circuit, and the current integrating sub-circuit is further coupled to the second input terminal. The driving method includes:

acquiring, by the first voltage acquisition sub-circuit, a first voltage of the first input terminal, and transmitting, by the first voltage acquisition sub-circuit, the first voltage to the current integrating sub-circuit; generating and outputting, by the current integrating sub-circuit, a second voltage according to the first voltage and an integral of a driving current transmitted to the current integrating sub-circuit through the second input terminal over time; and outputting, by the current integrating sub-circuit, the first voltage in response to an integral control signal received by the current integrating sub-circuit.

In some embodiments, the sampling circuit further includes a differencing sub-circuit coupled to the current integrating sub-circuit, and the driving method further includes: obtaining, by the differencing sub-circuit, a difference between the first voltage and the second voltage to obtain a third voltage, and outputting, by the differencing sub-circuit, the third voltage.

BRIEF DESCRIPTION OF THE DRAWINGS

In order to describe technical solutions in the present disclosure more clearly, accompanying drawings to be used in some embodiments of the present disclosure will be introduced briefly. However, the accompanying drawings to be described below are merely accompanying drawings of some embodiments of the present disclosure, and a person having ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

FIGS. 10A(1) and 10A(2) are diagrams showing signal transmissions in the pixel sampling circuit shown in FIG. 8 in a display phase;

FIGS. 10B(1) to 10B(3) are diagrams showing signal transmissions in the pixel sampling circuit shown in FIG. 8 in an acquisition phase;

DETAILED DESCRIPTION

Figure 1:
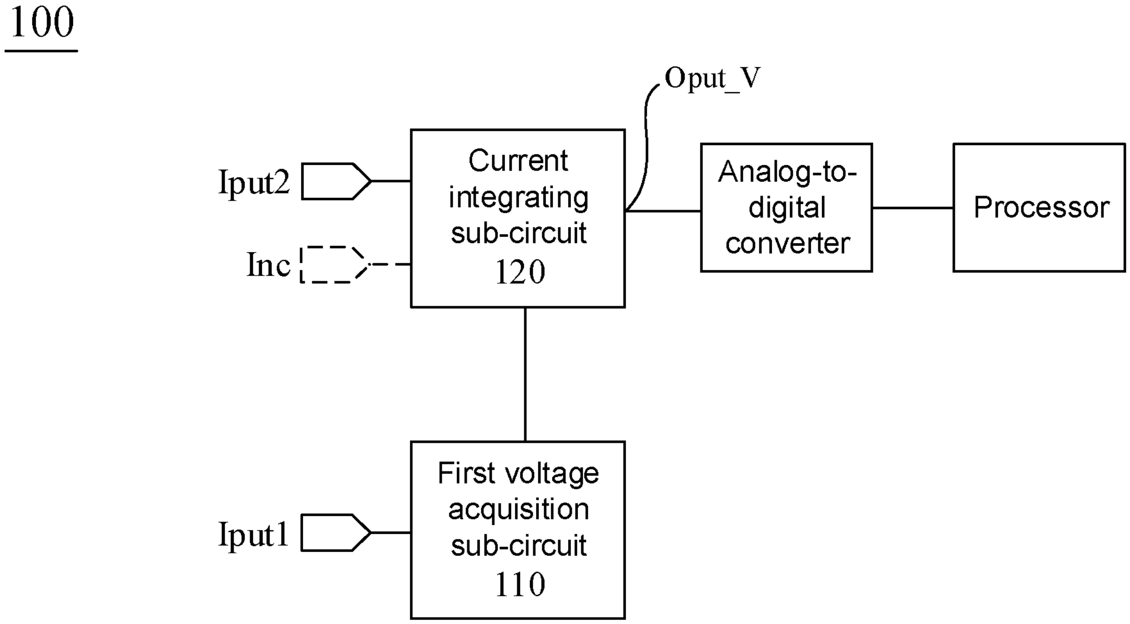
FIG. 1 is a structural diagram of a sampling circuit, in accordance with some embodiments of the present disclosure.

Technical solutions in some embodiments of the present disclosure will be described clearly and completely below with reference to the accompanying drawings. However, the described embodiments are merely some but not all of embodiments of the present disclosure. All other embodiments obtained by a person having ordinary skill in the art based on the embodiments of the present disclosure shall be included in the protection scope of the present disclosure.

Unless the context requires otherwise, throughout the description and claims, the term “comprise” and other forms thereof such as the third-person singular form “comprises” and the present participle form “comprising” are construed as an open and inclusive meaning, i.e., “including, but not limited to”. In the description of the specification, the terms such as “one embodiment”, “some embodiments”, “exemplary embodiments”, “example”, “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, terms such as "first" and "second" are used for descriptive purposes only and are not to be construed as indicating or implying the relative importance or implicitly indicating the number of indicated technical features below. Thus, features defined as "first" and "second" may explicitly or implicitly include one or more of the features. In the description of the embodiments of the present disclosure, "a/the plurality of" means two or more unless otherwise specified.

Some embodiments may be described using the expressions "coupled" and "connected" along with their derivatives. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the content herein.

The expression "at least one of A, B, and C" has a same meaning as the expression "at least one of A, B, or C", and both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The use of "suitable for" or "configured to" herein means an open and inclusive expression, which does not exclude devices that are applicable to or configured to perform additional tasks or steps.

Additionally, the use of "based on" is meant to be open and inclusive, in that a process, step, calculation, or other action "based on" one or more recited conditions or values may, in practice, be based on additional conditions or value beyond those recited.

As used herein, the term such as "about", "substantially" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

A luminous intensity of a sub-pixel in an organic light-emitting diode (OLED) display panel is in direct proportion to a driving current flowing through a light-emitting device therein, and in the sub-pixel, the driving current flowing through the light-emitting device is controlled by a driving transistor in a pixel driving circuit in the sub-pixel. Under an influence of process technology of driving transistors, threshold voltages Vth of the driving transistors in the OLED display panel are not exactly the same, so that there is a difference in driving currents flowing through the driving transistors after an equal data signal (e.g., an initial voltage) is written into a gate of each driving transistor, resulting in a problem of display nonuniformity in the OLED display panel.

An external electrical compensation method is used to compensate for the threshold voltage of the driving transistor. The electrical external compensation method includes sampling an anode voltage of the light-emitting device using a voltage sampling circuit, and calculating a compensation voltage according to the anode voltage obtained through sampling. However, since the sampling circuit is an analog circuit, and there is a common-mode noise, so that a voltage output by the sampling circuit includes a common-mode noise value. That is, the voltage output by the sampling circuit is an inaccurate anode voltage.

In light of this, embodiments of the present disclosure provide a sampling circuit for accurately acquiring an electrical signal in a pixel driving circuit.

The sampling circuit refers to a circuit that can acquire an electrical signal in a target circuit and output the acquired electrical signal. The target circuit refers to a circuit in which an electrical signal is to be acquired. For example, in a case where the sampling circuit is applied to a display apparatus, the target circuit may be a pixel driving circuit in a display panel of the display apparatus. Electrical signals that can be acquired by the sampling circuit include voltages and currents. For example, the sampling circuit may be coupled to a node at which an electrical signal thereon is to be acquired in the target circuit and configured to acquire the electrical signal of the node. For example, the sampling circuit is configured to acquire a voltage of the node, or is configured to acquire a current flowing through the node.

The sampling circuit may include a plurality of electronic elements and a plurality of wires coupling the electronic elements. For example, the electronic elements in the sampling circuit may include operational amplifiers, capacitors, switches, and resistors. The operational amplifier may implement a specific operational function. For example, an inverting terminal of the operational amplifier is coupled to an output terminal thereof to form a voltage follower, so as to output a voltage input from a non-inverting terminal thereof through the output terminal. In addition, the operational amplifier may also be combined with other electronic elements to realize other operational functions. For example, the operational amplifier and the capacitor are combined to form an integrator, and the operational amplifier and the resistor are combined to form a subtractor.

FIG. 1 shows a sampling circuit in accordance with some embodiments of the present disclosure. The sampling circuit 100 includes: a first input terminal Iput1, a second input terminal $Iput^2$, a first voltage acquisition sub-circuit 110 and a current integrating sub-circuit 120.

An input terminal of the sampling circuit 100 is coupled to a node at which an electrical signal thereon is to be acquired in a target circuit, and is configured to receive the electrical signal of the node. The sampling circuit includes at least one input terminal. Each input terminal may be independently coupled to a different node in the target circuit, and may receive a different electrical signal. For example, referring to FIG. 1, the sampling circuit 100 includes the first input terminal Iput1 and the second input terminal Iput2. The first input terminal Iput1 is configured to receive a voltage signal in the target circuit, for example, the first input terminal Iput1 is coupled to a first node in the target circuit, and is configured to receive a first voltage V1 of the first node. The second input terminal Iput2 is configured to receive a current signal in the target circuit, for example, the second input terminal Iput2 is coupled to a second node in the target circuit, and is configured to receive a driving current Id flowing through the second node.

The first voltage acquisition sub-circuit 110 is coupled to the first input terminal Iput1 and the current integrating sub-circuit 120, and is configured to acquire a first voltage V1 of the first input terminal Iput1 and transmit the first voltage V1 to the current integrating sub-circuit 120.

For example, the first voltage acquisition sub-circuit 110 may read the first voltage V1 of the first input terminal Iput1 and transmit the read first voltage V1 to the current integrating sub-circuit 120.

The current integrating sub-circuit 120 is further coupled to the second input terminal Iput2, and is configured to generate and output a second voltage V2 according to the first voltage V1 and an integral of the driving current Id transmitted to the current integrating sub-circuit 120 through the second input terminal Iput2 over time; and output the first voltage V1 in response to an integral control signal.

The current integrating sub-circuit 120 may integrate the received electrical signal, for example, the current integrating sub-circuit 120 integrates the received driving current Id over time to generate a quantity of electric charge. The current integrating sub-circuit 120 may further output the second voltage V2 according to the generated quantity of electric charge and the first voltage V1.

For example, the current integrating sub-circuit 120 may be coupled to an integral control signal terminal, and is configured to receive the integral control signal of the integral control signal terminal Inc.

The integral control signal may control output of the current integrating sub-circuit 120. For example, the integral control signal is a signal output within a specific time period.

For example, the current integrating sub-circuit 120 receives the first voltage V1 transmitted by the first voltage acquisition sub-circuit 110, and the current integrating sub-circuit 120 directly outputs the received first voltage V1 in a time period in which the integral control signal is output; and in a time period in which the integral control signal is not output, the current integrating sub-circuit 120 generates and outputs the second voltage V2 according to the first voltage V1 and the integral of the driving current Id transmitted to the current integrating sub-circuit 120 through the second input terminal Iput2 over time.

For another example, the integral control signal is a signal formed by an effective signal and an ineffective signal alternately. In a case where the integral control signal is the effective signal, the current integrating sub-circuit 120 directly outputs the received first voltage V1; and in a case where the integral control signal is the ineffective signal, the current integrating sub-circuit 120 generates and outputs the second voltage V2 according to the first voltage V1 and the integral of the driving current Id transmitted to the current integrating sub-circuit 120 through the second input terminal Iput2 over time.

In addition, the current integrating sub-circuit 120 may further include a voltage output terminal Oput_V, and is configured to output the first voltage V1 and the second voltage V2 through the voltage output terminal Oput_V.

Figure 2:
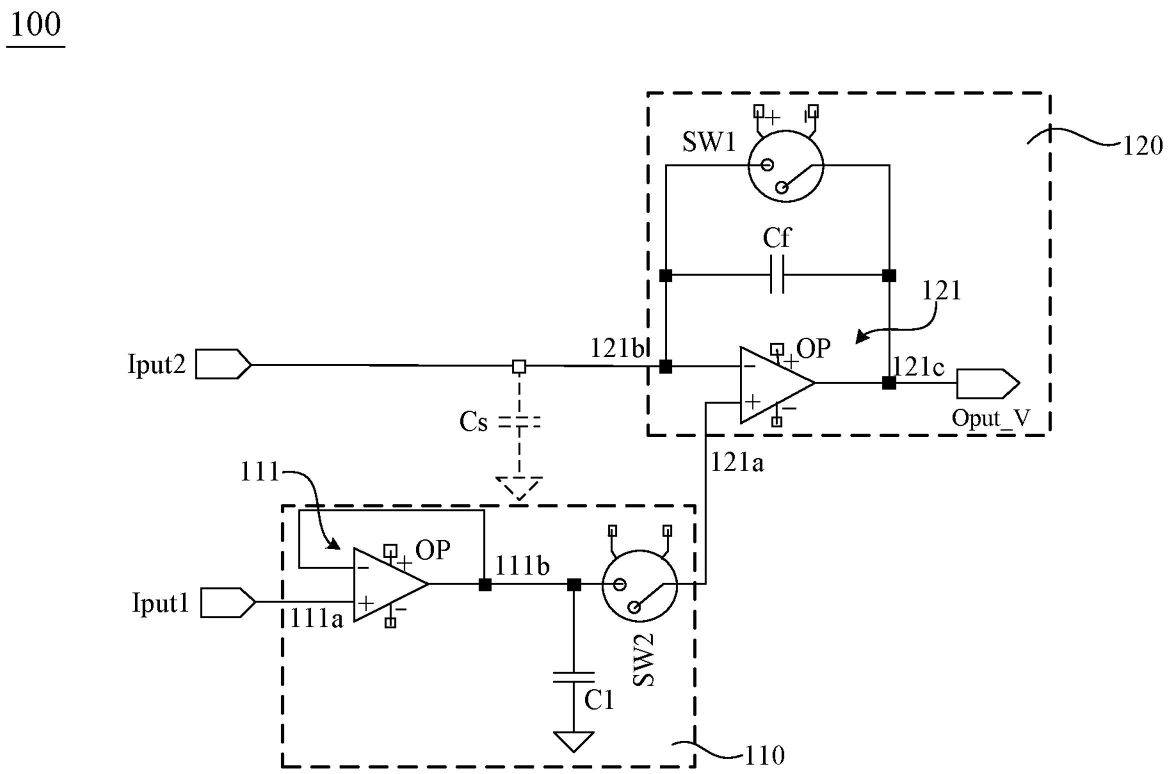
FIG. 2 is a circuit diagram of another sampling circuit, in accordance with some embodiments of the present disclosure.

Referring to FIG. 2, some embodiments of the present disclosure provide a sampling circuit, and the sampling circuit may include: a first voltage follower 111, an integrator 121 and a first switching device SW1. The sampling circuit may serve as a specific implementation manner of the sampling circuit provided in FIG. 1, or may not be limited to implementing functions that can be implemented by the sub-circuits in FIG. 1.

An input terminal 111*a* of the first voltage follower is coupled to the first input terminal Iput1.

The voltage follower includes an operational amplifier OP, and an inverting terminal of the operational amplifier OP is coupled to an output terminal thereof, so that a signal output by the output terminal of the operational amplifier OP is the same as a signal input by a non-inverting terminal of the operational amplifier OP. For example, the non-inverting terminal of the operational amplifier OP inputs the first voltage V1, and the output terminal of the operational amplifier OP also outputs the first voltage V1. In a case where the inverting terminal and the output terminal of the operational amplifier OP are coupled to form the voltage follower, the input terminal 111*a* of the voltage follower is the non-inverting terminal of the operational amplifier, and an output terminal 111*b* of the voltage follower is the output terminal of the operational amplifier OP.

The integrator 121 includes: a non-inverting input terminal 121*a*, an inverting input terminal 121*b* and an output terminal 121*c*. The non-inverting input terminal 121*a* of the integrator is coupled to the first voltage acquisition sub-circuit 110, and the inverting input terminal 121*b* of the integrator is coupled to the second input terminal Iput2.

The integrator 121 includes an operational amplifier OP and a capacitor Cf. An electrode plate of the capacitor Cf is coupled to an inverting terminal of the operational amplifier OP, and the other electrode plate of the capacitor Cf is coupled to an output terminal of the operational amplifier OP. In a case where the operational amplifier OP and the capacitor Cf form the integrator 121, the non-inverting input terminal 121*a* of the integrator is a non-inverting terminal of the operational amplifier OP, the inverting input terminal 121*b* of the integrator is the inverting terminal of the operational amplifier, and the output terminal 121*c* of the integrator is the output terminal of the operational amplifier OP.

The first switching device SW1 is connected in parallel between the non-inverting input terminal 121*a* of the integrator and the inverting input terminal 121*b* of the integrator, and is configured to be closed in response to the integral control signal.

The first switching device SW1 is controlled by the integral control signal. For example, the first switching device SW1 may be a switch that is normally open or normally closed. For example, the first switching device SW1 is a switch that is normally open, and when the integral control signal is not received, the first switching device SW1 is in an open state, and the first switching device SW1 is closed upon receipt of the integral control signal. For another example, the first switching device SW1 is a timing-controlled switching device. For example, the first switching device SW1 may be a transistor or another switching device. The first switching device SW1 is controlled by the effective signal and the ineffective signal. In a case where the integral control signal controlling the first switching device SW1 is the effective signal, the first switching device SW1 is closed to form a path, and in a case where the integral control signal controlling the first switching device SW1 is the ineffective signal, the first switching device SW1 is open to cut off the path.

It will be noted that, the embodiments of the present disclosure are all described by taking an example in which the switching devices (including the first switching device SW1 and switching devices SW2 to SW6 to be described later) are normally open switches that are closed in response to corresponding control signals. However, types of the switching devices are not limited in the embodiments of the present disclosure. For example, the switching devices described in the embodiments of the present disclosure may be normally closed switches that are open only in response to corresponding control signals. Alternatively, the switching devices described in the embodiments of the present disclosure are switches controlled alternately by the effective signal and the ineffective signal, the switches are closed under control of the effective signal, and are open under control of the ineffective signal.

For example, in the sampling circuit 100, the first voltage acquisition sub-circuit 110 includes the first voltage follower 111, and the current integrating sub-circuit 120 includes the integrator 121 and the first switching device SW1.

Figure 3:
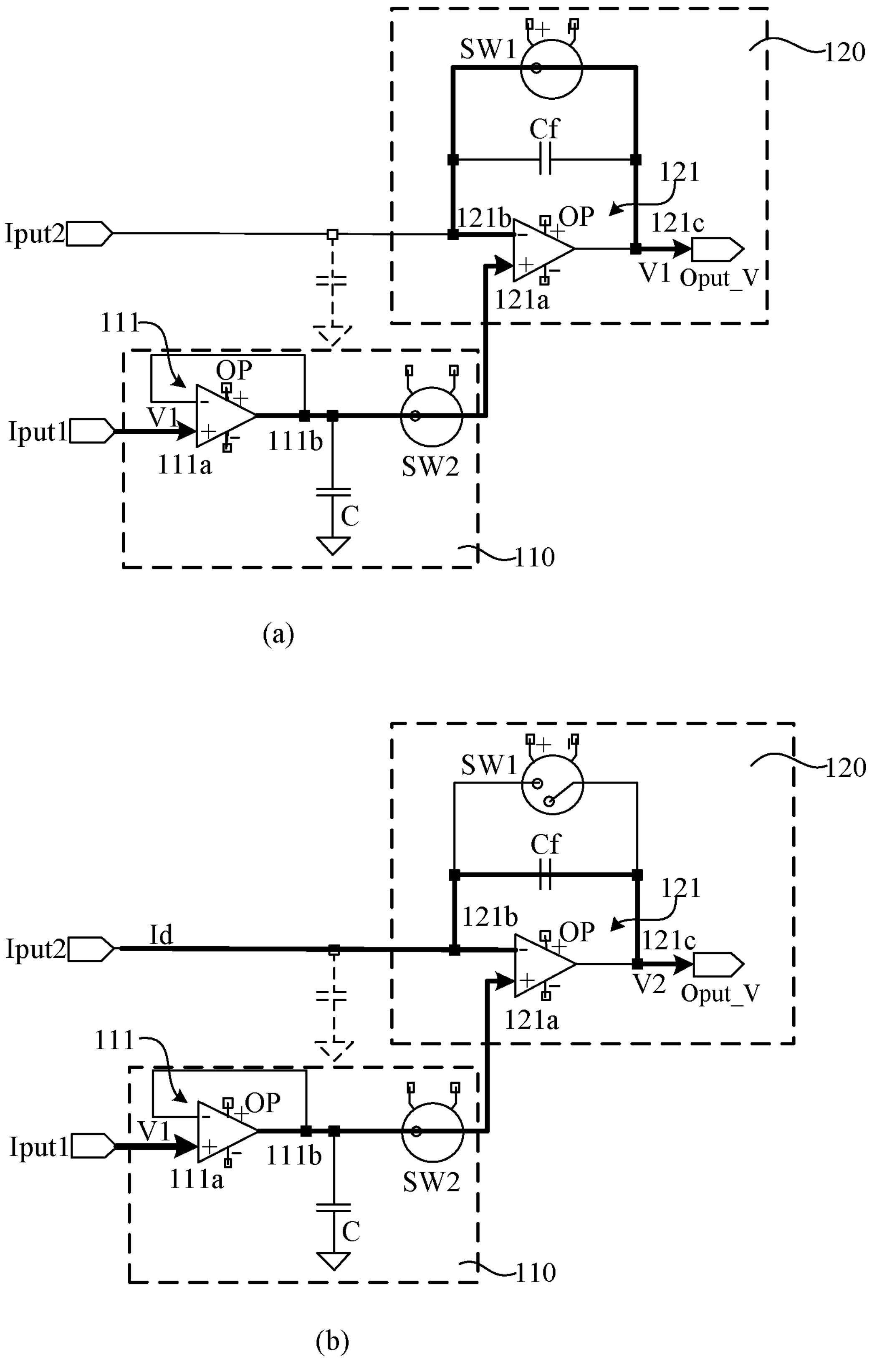
FIG. 3 is a diagram showing signal transmissions in the sampling circuit shown in FIG. 2.

FIG. 3 is a diagram showing signal transmissions in the sampling circuit shown in FIG. 2 in different phases, where (a) in FIG. 3 shows a signal transmission in the sampling circuit shown in FIG. 2 in a first phase of an acquisition phase, and (b) in FIG. 3 shows a signal transmission in the sampling circuit shown in FIG. 2 in a second phase of the acquisition phase.

A driving principle of the sampling circuit 100 will be described below with reference to the signal transmissions shown in FIG. 3. In the first phase of the acquisition phase, referring to (a) in FIG. 3, the first input terminal Iput1 receives the first voltage V1 in the target circuit, and transmits the first voltage V1 to the non-inverting terminal of the operational amplifier OP in the integrator 121 through the first voltage follower 111. In this case, the first switching device SW1 is closed in response to the integral control signal, so that the inverting terminal of the operational amplifier OP in the integrator 121 is coupled to the output terminal of the operational amplifier OP to form a voltage follower, and the first voltage V1 of the non-inverting terminal of the operational amplifier OP is output through the inverting terminal of the operational amplifier OP, and in turn, the voltage output terminal Oput_V outputs the first voltage V1.

In the second phase of the acquisition phase, referring to (b) in FIG. 3, the first switching device SW1 is open, the integrator 121 is operating, the non-inverting input terminal 121*a* of the integrator inputs the first voltage V1, the inverting input terminal 121*b* of the integrator inputs the driving current Id received by the second input terminal Iput, and the output terminal of the integrator 121 outputs the second voltage V2 according to an operation formula, i.e., $(V1-V2)*Cf=\int_0^T Id(dt)$, where T is a charging time of the capacitor, i.e., a time from the first switching device SW1 being open to the integrator 121 outputting the stable second voltage V2. Considering that the driving current Id to be acquired in the target circuit is a constant current, therefore, the second voltage V2 output by the voltage output terminal Oput_V is: $V2=V1-Id*T/Cf$.

After the sampling circuit 100 outputs the first voltage V1 and the second voltage V2 respectively in the first phase and the second phase of the acquisition phase, a difference between the first voltage V1 and the second voltage V2 may be further calculated by a processor, i.e., $V1-V2=Id*T/Cf$ and in turn, a value of a driving current Id' is obtained. The value of the driving current Id' obtained according to the first voltage V1 and the second voltage V2 is the driving current Id in the target circuit acquired by the sampling circuit 100.

For example, referring to FIG. 1, the voltage output terminal Oput_V of the sampling circuit 100 may be coupled to an analog-to-digital converter, and is configured to convert a received analog signal into a digital signal. For example, the voltage output terminal Oput_V respectively outputs the first voltage V1 and the second voltage V2 in the first phase and the second phase of the acquisition phase, and since the sampling circuit 100 is an analog circuit, the output first voltage V1 and second voltage V2 are both analog signals. The first voltage V1 and the second voltage V2 are successively received by the analog-to-digital converter, so that the first voltage V1 and the second voltage V2 are converted into digital signals. For example, the analog-to-digital converter is further coupled to the processor, and the digital signals after conversion may be used directly by the processor, and the driving current Id' is calculated by the processor.

In the above embodiments, the sampling circuit outputs the first voltage V1 and the second voltage V2 separately, where the first voltage V1 and the second voltage V2 both include common mode noises caused by the sampling circuit. After the difference between the first voltage V1 and the second voltage V2 is obtained, values of the common mode noises included in the first voltage V1 and the second voltage V2 may be cancelled. In addition, the difference between the first voltage V1 and the second voltage V2 is a function of the driving current received by the second input terminal. Therefore, the driving current in the target circuit may be effectively extracted through the sampling circuit, and since the difference between the first voltage V1 and the second voltage V2 does not include the common mode noises, the extracted driving current also filters out the common mode noises, so that accuracy of extracting the driving current is ensured.

In the embodiments of the present disclosure, the first voltage V1 and the second voltage V2 are output through the sampling circuit separately, which facilitates obtaining of the difference between the first voltage V1 and the second voltage V2 subsequently and cancellation of the values of the common mode noises included in the first voltage V1 and the second voltage V2. In addition, the first voltage V1 and the second voltage V2 may also serve as a calculation basis for the acquired electrical signal in the target circuit, so that the electrical signal to be acquired is acquired accurately from the target circuit, and accuracy of sampling is ensured.

In the sampling circuit 100, a long wire is usually required between the second input terminal Iput2 and the current integrating sub-circuit 120, so as to transmit the driving current Id to the current integrating sub-circuit 120, and as a result, a parasitic capacitance Cs exists between the second input terminal Iput2 and the current integrating sub-circuit 120.

In some embodiments, the second input terminal Iput2 is configured to be coupled to the first input terminal Iput1. For example, the second input terminal Iput2 of the sampling circuit 100 is coupled to the first input terminal Iput1. In the first phase of the acquisition phase, the first input terminal Iput1 receives the first voltage V1 of a node in the target circuit, and the first voltage V1 may be transmitted to the current integrating sub-circuit 120 through the second input terminal Iput2; and in the second phase of the acquisition phase, the first input terminal Iput1 receives the driving current Id of the node, and the driving current Id may be transmitted to the current integrating sub-circuit 120 through the second input terminal Iput2. For example, the second input terminal Iput2 and the first input terminal Iput1 may be coupled through a transistor, and the transistor may control transmission of the electrical signal received by the first input terminal Iput1 to the second input terminal Iput2.

In a case where the second input terminal Iput2 is coupled to the first input terminal Iput1, the sampling circuit 100 is only coupled to a single node in the target circuit, so that the sampling circuit 100 may acquire both a voltage of the node and the driving current flowing through the node.

In some embodiments, referring to FIG. 2, the first voltage acquisition sub-circuit 110 further includes: a first capacitor C1 and a second switching device SW2.

A first electrode plate of the first capacitor C1 is coupled to the output terminal 111*b* of the first voltage follower, and a second electrode plate of the first capacitor C1 is grounded; and the second switching device SW2 is coupled between the first electrode plate of the first capacitor C1 and the current integrating sub-circuit 120.

The first capacitor C1 may be used to store a signal output by the first voltage follower 111, and the second switching device SW2 may be used to control transmission of the electrical signal output by the first voltage follower 111 to the current integrating sub-circuit 120. For example, the first capacitor C1 stores the first voltage V1 from the first voltage follower 111, and transmits the first voltage V1 to the current integrating sub-circuit 120 under control of the second switching device SW2. The second switching device SW2 may be closed at an appropriate time depending on needs of the sampling circuit 100, so as to transmit the electrical signal stored in the first capacitor C1 to the current integrating sub-circuit 120 at a specific time.

Figure 4:
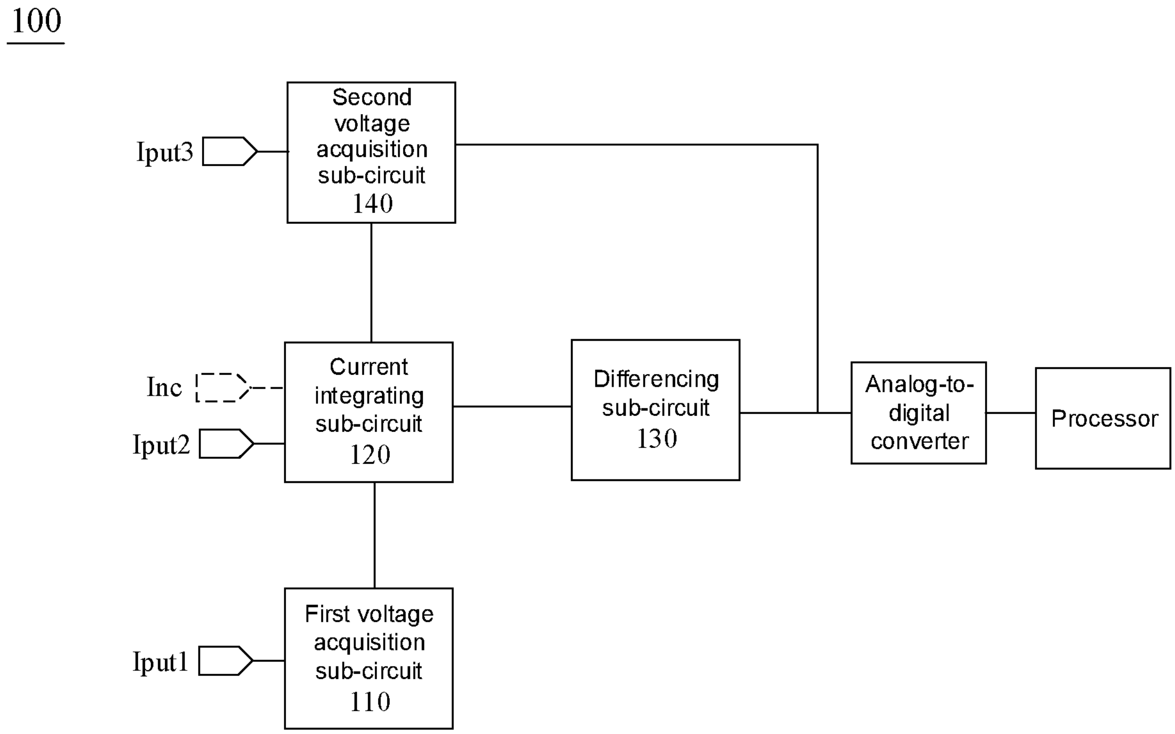
FIG. 4 is a structural diagram of yet another sampling circuit, in accordance with some embodiments of the present disclosure.

In some embodiments, referring to FIG. 4, the sampling circuit 100 further includes a differencing sub-circuit 130. The differencing sub-circuit 130 is coupled to the current integrating sub-circuit 120, and is configured to obtain the difference between the first voltage V1 and the second voltage V2 to obtain a third voltage V3.

For example, the differencing sub-circuit 130 includes two input terminals: a first differencing input terminal and a second differencing input terminal. The first differencing input terminal and the second differencing input terminal are each coupled to the current integrating sub-circuit 120 independently, the first differencing input terminal receives the first voltage V1, and the second differencing input terminal receives the second voltage V2.

Figure 5:
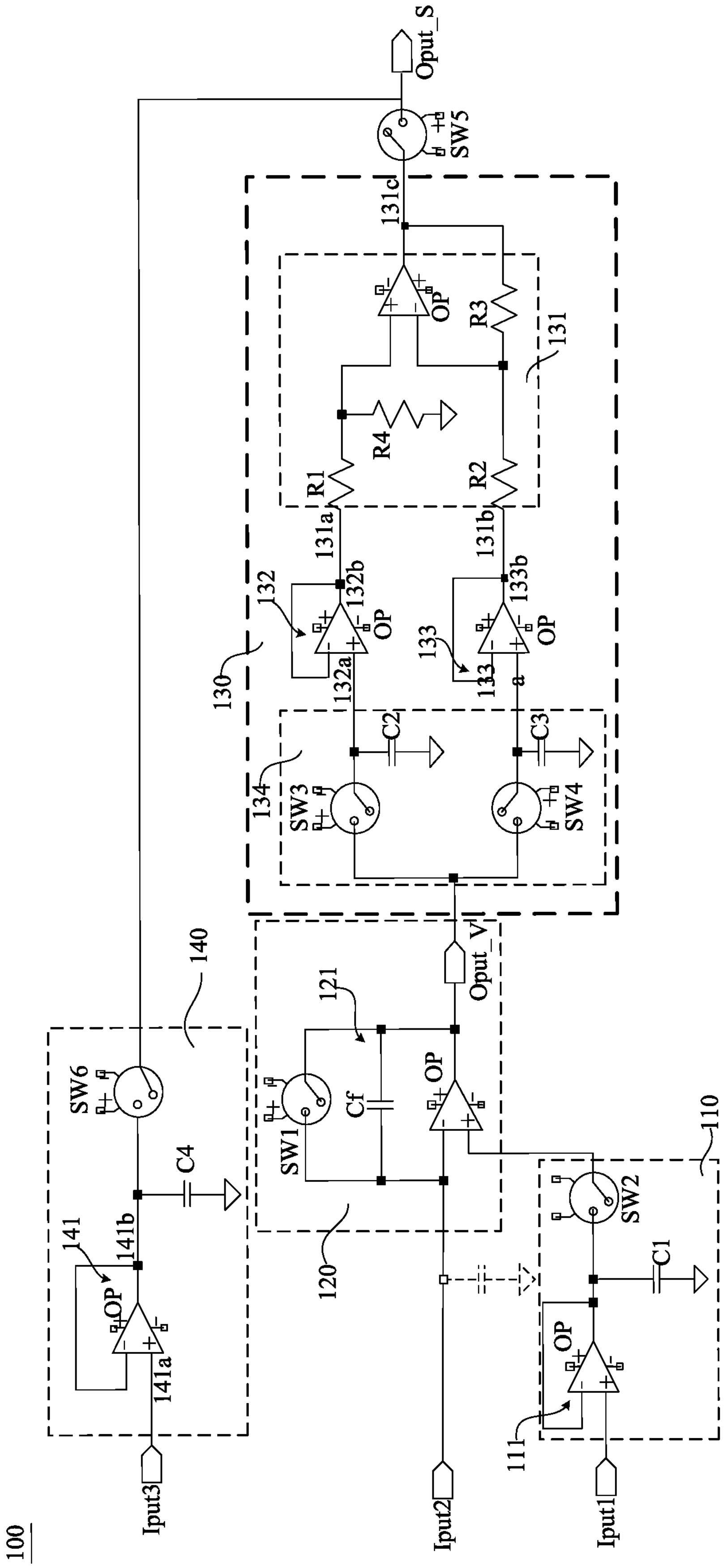
FIG. 5 is a circuit diagram of yet another sampling circuit, in accordance with some embodiments of the present disclosure.

FIG. 5 shows a sampling circuit in accordance with some embodiments of the present disclosure, and the sampling circuit may serve as a specific implementation manner of the sampling circuit provided in FIG. 4, or may not be limited to implementing functions that can be implemented by the sub-circuits in FIG. 4. The electronic elements included in the first voltage acquisition sub-circuit 110 and the current integrating sub-circuit 120 and coupling relationships thereof may be the same as those of the sampling circuit shown in FIG. 1 or 2, and will not be repeated again.

Referring to FIG. 5, the differencing sub-circuit 130 includes: a subtractor 131, a second voltage follower 132, and a third voltage follower 133.

The subtractor 131 includes a non-inverting input terminal 131*a*, an inverting input terminal 131*b* and an output terminal 131*c*. The subtractor 131 includes an operational amplifier OP and four resistors R1, R2, R3 and R4, and output of the subtractor may be obtained according to a subtraction formula. For example, a voltage provided by the non-inverting input terminal of the subtractor is Vi1, a voltage provided by the non-inverting input terminal of the subtractor is Vi2, and a voltage output by the output terminal of the subtractor is $$Vo = \left(1 + \frac{R3}{R2}\right)\left(\frac{R4/R1}{1 + R4/R1}\right)Vi2 - \frac{R3}{R2}Vi1.$$

If R1=R2=R3=R4, Vo=Vi2−Vi1, that is, an output voltage of the subtractor is equal to a difference between the voltage provided by the non-inverting input terminal and the voltage provided by the inverting input terminal.

An input terminal 132*a* of the second voltage follower is coupled to the current integrating sub-circuit 120, and an output terminal 132*b* of the second voltage follower is coupled to the non-inverting input terminal 131*a* of the subtractor.

An input terminal 133*a* of the third voltage follower is coupled to the current integrating sub-circuit 120, and an output terminal 133*b* of the third voltage follower is coupled to the inverting input terminal 131*b* of the subtractor.

For example, the input terminal 132*a* of the second voltage follower in the differencing sub-circuit 130 receives the first voltage V1 transmitted by the current integrating sub-circuit 120, and the input terminal 133*a* of the third voltage follower receives the second voltage V2 transmitted by the current integrating sub-circuit 120. The first voltage V1 and the second voltage V2 are transmitted to the non-inverting input terminal 131*a* and the inverting input terminal 131*b* of the subtractor 131 through the second voltage follower 132 and the third voltage follower 133, respectively. According to a calculation formula of the subtractor, the subtractor 131 outputs the third voltage V3=V1−V2 and the third voltage V3 may be output through the output terminal 131*c* of the subtractor.

In a case where the sampling circuit 100 includes the differencing sub-circuit 130, the sampling circuit directly outputs the third voltage V3, where the third voltage V3 is the difference between the first voltage V1 and the second voltage V2. That is, the third voltage V3 does not include the common mode noises caused by the sampling circuit, so that the electrical signal (the third voltage) output by the sampling circuit is accurate.

In addition, referring to FIG. 4, the differencing sub-circuit 130 may be coupled to the analog-to-digital converter and the processor. After the third voltage V3 output by the differencing sub-circuit 130 is converted into a digital signal through the analog-to-digital converter, the digital signal is directly transmitted to the processor for subsequent processing, and the processor does not need to perform a differencing operation on the first voltage V1 and the second voltage V2, and in turn, power consumption of the processor may be reduced.

In some embodiments, referring to FIG. 5, the current integrating sub-circuit 120 includes a voltage output terminal Oput_V, and the current integrating sub-circuit 120 is configured to output the first voltage V1 and the second voltage V2 through the voltage output terminal Oput_V.

The differencing sub-circuit 130 further includes a storage sub-circuit 13. The storage sub-circuit 134 is coupled to the voltage output terminal Oput_V of the current integrating sub-circuit 120, and is configured to, store the received first voltage V1 in response to a third control signal, and store the second voltage V2 in response to a fourth control signal.

For example, the current integrating sub-circuit 120 outputs the first voltage V1 and the second voltage V2 at different time through the voltage output terminal Oput_V. The storage sub-circuit 134 stores the first voltage V1 output by the current integrating sub-circuit 120 while the current integrating sub-circuit 120 outputs the first voltage V1, and the storage sub-circuit 134 stores the second voltage V2 output by the current integrating sub-circuit 120 while the current integrating sub-circuit 120 outputs the second voltage V2.

In some embodiments, referring to FIG. 5, the storage sub-circuit 134 includes: a second capacitor C2, a third capacitor C3, a third switching device SW3, and a fourth switching device SW4.

A second electrode plate of the second capacitor C2 is grounded.

A second electrode plate of the third capacitor C3 is grounded.

The third switching device SW3 is coupled between the voltage output terminal Oput_V and a first electrode plate of the second capacitor C2.

The fourth switching device SW4 is coupled between the voltage output terminal Oput_V and a first electrode plate of the third capacitor C3.

For example, the first voltage V1 output by the voltage output terminal Oput_V may be stored in the second capacitor C2, and the second voltage V2 output by the voltage output terminal Oput_V may be stored in the third capacitor C3.

For example, in the first phase of the acquisition phase, the third switching device SW3 is closed in response to the third control signal, and the storage sub-circuit 134 transmits and stores the first voltage V1 in the second capacitor C2; and in the second phase of the acquisition phase, the fourth-switching device SW4 is closed in response to the fourth control signal, and the storage sub-circuit 134 transmits and stores the second voltage V2 in the third capacitor C3.

In a case where the current integrating sub-circuit 120 includes only a single voltage output terminal Oput_V and the differencing sub-circuit 130 includes the storage sub-circuit 134, through timing control, the first voltage V1 and the second voltage V2 may be output and stored in a time-division manner through the voltage output terminal Oput_V. The stored first voltage V1 and second voltage V2 are simultaneously transmitted to the subtractor for the differencing operation to obtain the third voltage V3, which avoids a case where one subtractor needs to be coupled to two current integrating sub-circuits 120, and in turn, a volume of the sampling circuit 100 is reduced.

In some embodiments, referring to FIGS. 4 and 5, the sampling circuit 100 further includes a sampling output terminal Oput_S and a fifth switching device SW5, and the fifth switching device SW5 is coupled between the differencing sub-circuit 130 and the sampling output terminal Oput_S.

In a case where the sampling circuit 100 includes the fifth switching device SW5, the fifth switching device SW5 may control transmission of the third voltage V3 output by the differencing sub-circuit 130 to the sampling output terminal Oput_S, so that the third voltage V3 is output through the sampling output terminal Oput_S at required time.

In some embodiments, the sampling circuit 100 further includes: a second voltage acquisition sub-circuit 140. The second voltage acquisition sub-circuit 140 is coupled to a third input terminal Iput3, and is configured to acquire and output a fourth voltage V4 provided by the third input terminal Iput3.

For example, the third input terminal Iput3 is configured to receive the voltage signal in the target circuit, for example, the third input terminal Iput3 is coupled to a third node in the target circuit, and is configured to receive the fourth voltage V4 of the third node. Time for the third input terminal Iput3 to acquire the fourth voltage V4 is not limited in the embodiments of the present disclosure, and may be set as needed. For example, the time for the third input terminal Iput3 to acquire the fourth voltage V4 may be different from time for the first input terminal Iput1 to acquire the first voltage V1 and time for the second input terminal Iput2 to acquire the driving current Id.

In some embodiments, referring to FIG. 5, the second voltage acquisition sub-circuit includes: a fourth voltage follower 141 and a fourth capacitor C4.

An input terminal 141*a* of the fourth voltage follower is coupled to the third input terminal Iput3.

A first electrode plate of the fourth capacitor C4 is coupled to an output terminal 141*b* of the fourth voltage follower, and a second electrode plate of the fourth capacitor C4 is grounded.

In some embodiments, the second voltage acquisition sub-circuit 140 further includes a sixth switching device SW6, and the sixth switching device SW6 is coupled between the first electrode plate of the fourth capacitor C4 and the sampling output terminal Oput_S. The sixth switching device SW6 is configured to control transmission of the fourth voltage V4 to the sampling output terminal Oput_S.

For example, the fourth voltage V4 received by the third input terminal Iput3 is transmitted to the fourth capacitor C4 through the fourth voltage follower, and the fourth capacitor C4 stores the received fourth voltage V4. When the sixth switching device SW6 is closed in response to a six control signal, the fourth voltage V4 stored in the fourth capacitor C4 may be output through the sampling output terminal Oput_S.

The embodiments of the present disclosure further provide a display apparatus. The display apparatus refers to a product with an image display function, and may be, for example, a display, a TV, a billboard, a digital photo frame, a laser printer with a display function, a telephone, a mobile phone, a personal digital assistant (PDA), a digital camera, a portable camera, a viewfinder, a monitor, a navigator, a vehicle, a wall with a large area, a home appliance, or a piece of information query equipment (e.g., a piece of business query equipment of e-governments, banks, hospitals, power and other departments).

The display apparatus includes a display panel 20 and the sampling circuit 100. For example, the display panel may be an organic light-emitting diode (OLED) display panel, a quantum dot light-emitting diode (QLED) display panel, a micro LED (including a mini LED or a micro LED) display panel, or the like. The sampling circuit 100 may be an integrated circuit (IC), or the sampling circuit 100 may be an analog circuit including a number of electronic elements. In addition, the display apparatus may further include other components, such as a printed circuit board (PCB) and a flexible circuit board (FPC) that are coupled to the display panel, and a power supply system for supplying power to the display panel.

Figure 6:
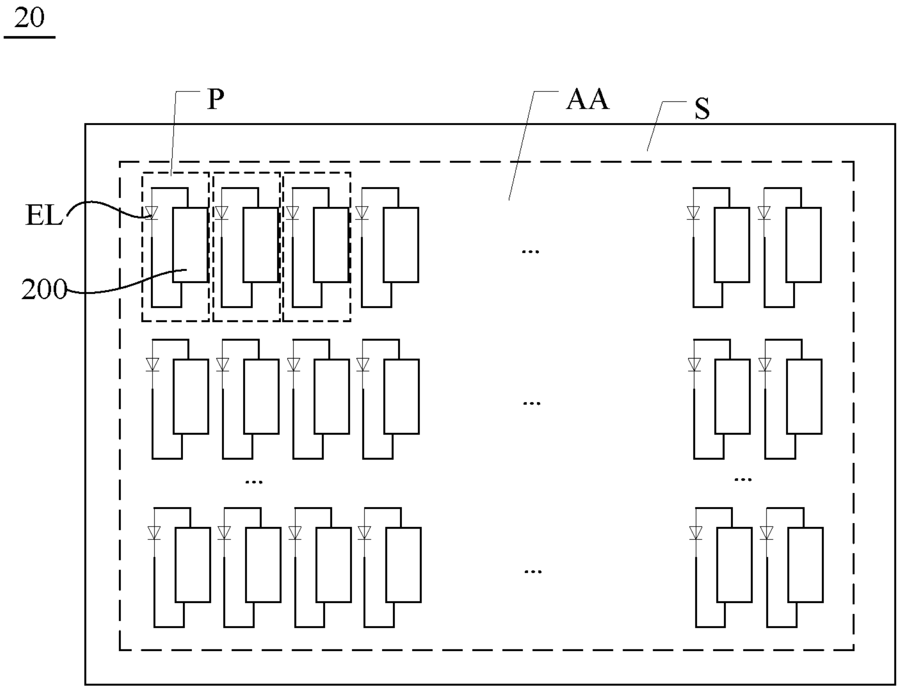
FIG. 6 is a top view of a display panel, in accordance with some embodiments of the present disclosure.

FIG. 6 is a top view of the display panel 20 in accordance with some embodiments of the present disclosure. Referring to FIG. 6, the display panel 20 has an active area (AA) and a peripheral area S on at least one side of the AA. For example, the peripheral area S may be arranged around the AA.

The display panel includes: a plurality of sub-pixels P arranged in the AA, and each sub-pixel P includes a pixel driving circuit 200 and a light-emitting device EL (e.g., OLED) coupled to each other. It will be worth noting that, FIG. 6 only shows a coupling relationship between the pixel driving circuit 200 and the light-emitting device EL in the sub-pixel P, but a size of the light-emitting device is not limited thereto, for example, sizes of the light-emitting devices EL are not the same; and positions of the pixel driving circuit 200 and the light-emitting device EL are not limited thereto. For example, the light-emitting device EL and the pixel driving circuit 200 coupled thereto may have an overlapping region in a thickness direction of the display panel.

A structure of the pixel driving circuit may be designed depending on actual situations. For example, the pixel driving circuit is composed of electronic devices such as transistors and capacitors (C). For example, the pixel driving circuit may include three transistors (two switching transistors and one driving transistor) and one capacitor, constituting a 3T1C structure; of course, the pixel driving circuit may include more than three transistors (a plurality of switching transistors and a single driving transistor) and at least one capacitor, for example, the pixel driving circuit may include one capacitor and four transistors, constituting a 4T1C structure.

The transistors may be field effect transistors (FETs, e.g., thin film transistors (TFTs)) or other switching devices with same characteristics, and the embodiments of the present disclosure will all be described by taking the thin film transistors as an example.

A control electrode of the thin film transistor is a gate, a first electrode of the thin film transistor is one of a source and a drain, and a second electrode of the thin film transistor is the other of the source and the drain. Since the source and the drain of the thin film transistor can have a same effect in the thin film transistor, the source and the drain may not be specially distinguished. In an example, in a case where the thin film transistor is a P-type transistor, the first electrode of the thin film transistor is the source, and the second electrode thereof is the drain. In another example, in a case where the thin film transistor is an N-type transistor, the first electrode of the thin film transistor is the drain, and the second electrode thereof is the source.

In the embodiments of the present disclosure, the description of the pixel driving circuit is given by taking the P-type transistor as an example. It will be noted that, the embodiments of the present disclosure include, but are not limited thereto. For example, one or more thin-film transistors in the pixel driving circuit may adopt N-type transistors, and it is only required that the electrodes of the thin-film transistors of a selected type are connected correspondingly according to the electrodes of the corresponding thin film transistors in the embodiments of the present disclosure, and corresponding control electrodes are supplied with corresponding high-level voltages or corresponding low-level voltages.

The pixel driving circuit 200 in the display apparatus may be coupled to the sampling circuit 100 to form a pixel sampling circuit 30. In the pixel sampling circuit 30, the target circuit sampled by the sampling circuit 100 is the pixel driving circuit 200. For example, the pixel driving circuit 200 in the pixel sampling circuit 30 is located in the display panel, and the sampling circuit 100 may be located on the printed circuit board or the flexible circuit board that are coupled to the display panel.

The embodiments of the present disclosure will be described by taking the pixel driving circuit of 4T1C as an example, and driving methods of other types of pixel driving circuits, such as 3T1C and 7T1C, may refer to the embodiments of the present disclosure.

Figure 7:
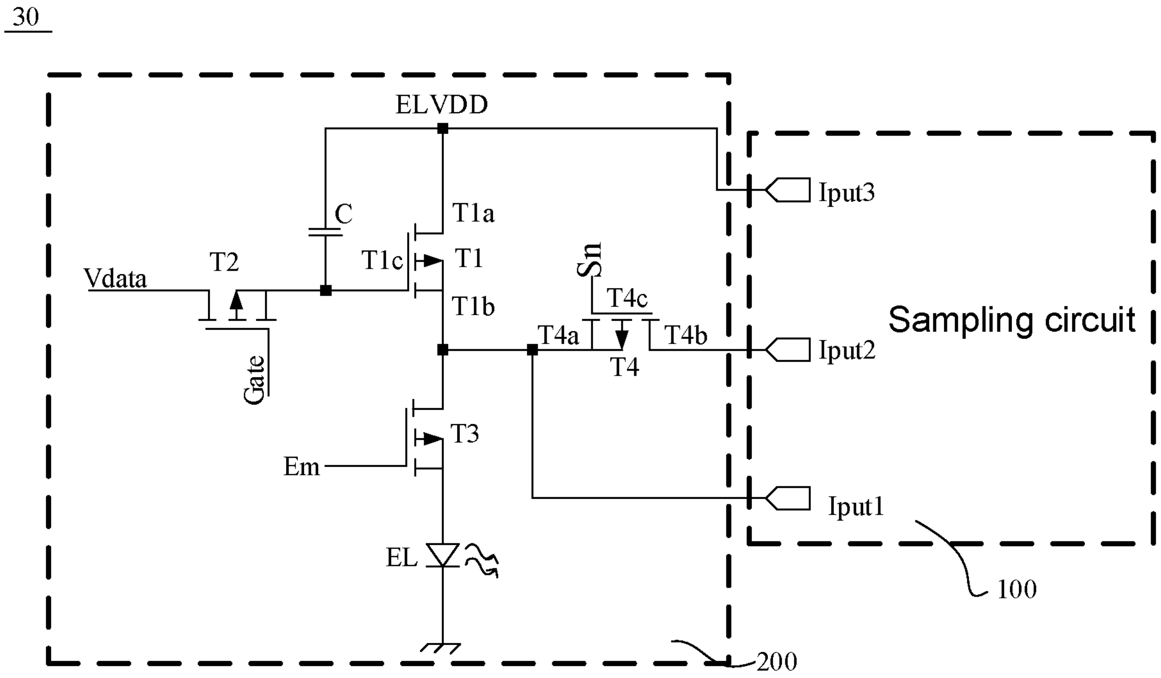
FIG. 7 is a structural diagram of a pixel sampling circuit, in accordance with some embodiments of the present disclosure.

Referring to FIG. 7, the pixel driving circuit 200 includes a driving transistor T1, and the driving transistor T1 includes a first electrode T1*a*, a second electrode T1*b* and a control electrode T1*c*. The second electrode T1*b* of the driving transistor is coupled to the first input terminal Iput1 of the sampling circuit 100, and the pixel driving circuit 200 is configured to transmit the driving current Id flowing through the first electrode T1*a* and the second electrode T1*b* of the driving transistor to the second input terminal Iput2 of the sampling circuit 100. For example, a voltage of the second electrode T1*b* of the driving transistor is transmitted to the first input terminal Iput1 of the sampling circuit 100.

In some embodiments, the pixel driving circuit 200 further includes a sensing transistor T4. A control electrode T4*c* of the sensing transistor is coupled to a scan signal terminal Sn, and is configured to be turned on under control of a sensing signal Sn, a second electrode T4*b* of the transistor is coupled to the second input terminal Iput2 of the sampling circuit 100, and a first electrode T4*a* of the sensing transistor is coupled to the first input terminal Iput1. The driving current Id flowing through the first electrode T1*a* and the second electrode T1*b* of the driving transistor is transmitted to the second input terminal Iput2 through the sensing transistor T4.

In addition, the pixel driving circuit 200 further includes a scan transistor T2, a light-emitting control transistor T3 and a capacitor C. For example, the scan transistor T2 is turned on under control of a scan signal Gate, and transmits a data signal Data to the control electrode T1*c* of the driving transistor, and the light-emitting control transistor T3 is turned on under control of a light-emitting control signal EM, so as to control the driving current Id to flow through the light-emitting device EL, so that the light-emitting device EL emits light.

It will be noted that, in the description of the embodiments of the present disclosure, a symbol “Gate” can represent not only a scan signal terminal, but also a scan signal, a symbol “Data” can represent not only a data signal terminal, but also a data signal (i.e., Vdata), a symbol “EM” can represent not only a light-emitting control signal terminal, but also a light-emitting control signal, and a symbol “Sn” can represent not only a sensing signal terminal, but also a sensing signal.

A sampling principle of the pixel sampling circuit 30 shown in FIG. 8 will be described below in combination with timing in FIG. 9. It will be noted that, a sampling process of the pixel sampling circuit 30 is divided into a display phase and an acquisition phase, the display phase includes a data writing phase D1 and a light-emitting phase D2, and the acquisition phase includes a first phase S1, a second phase S2 and a third phase S3.

Figure 8:
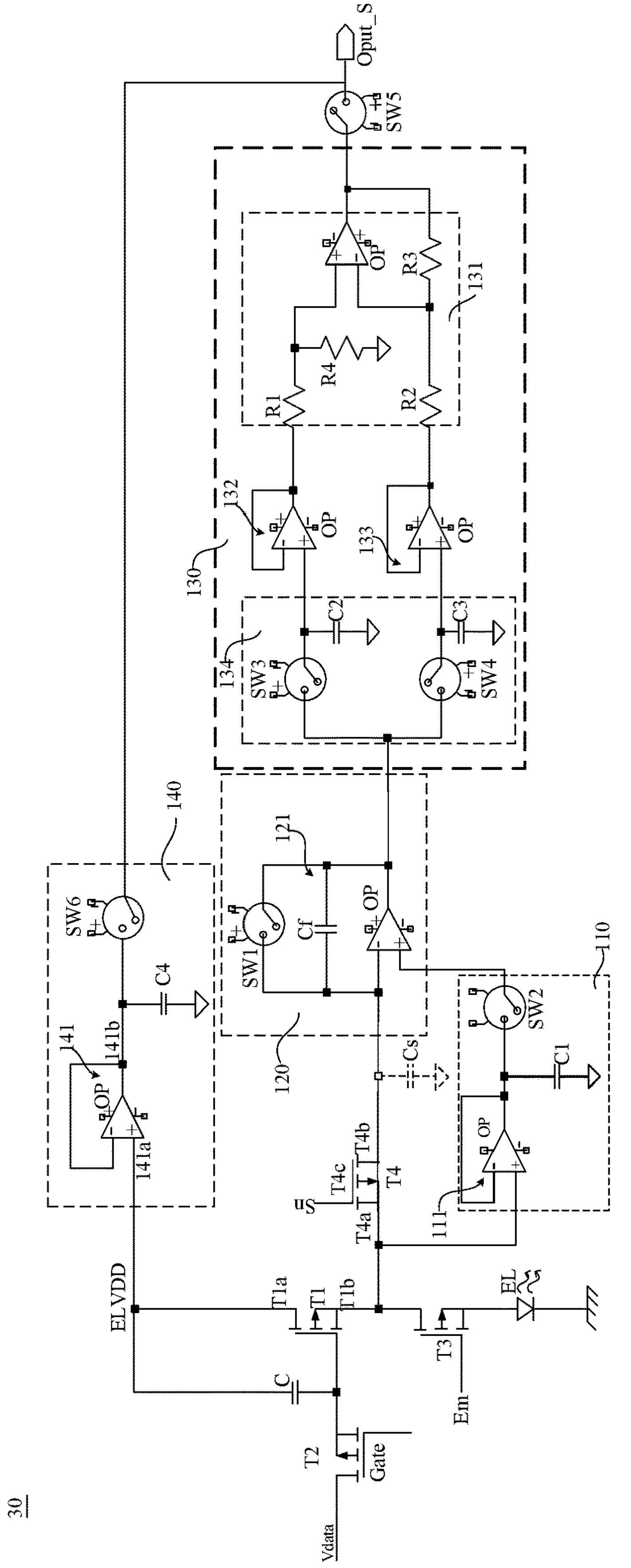
FIG. 8 is a circuit diagram of another pixel sampling circuit, in accordance with some embodiments of the present disclosure.
Figure 9:
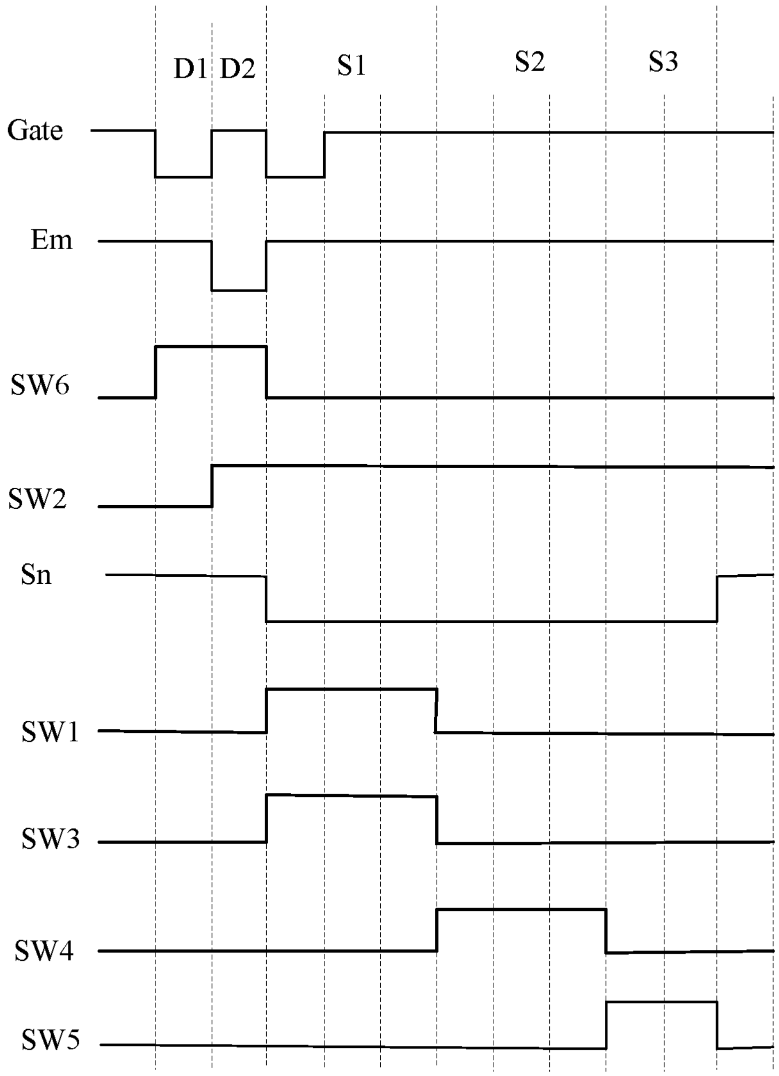
FIG. 9 is a timing control diagram of the pixel sampling circuit shown in FIG. 8.

FIGS. 10A(1) and 10A(2), and FIGS. 10B(1) to 10B(3) are diagrams showing signal transmissions in the sampling circuit in different phases, where FIGS. 10A(1) and 10A(2) are diagrams showing signal transmissions in the pixel sampling circuit shown in FIG. 8 in the display phase of sampling, and FIGS. 10B(1) to 10B(3) are diagrams showing signal transmissions in the pixel sampling circuit shown in FIG. 8 in the acquisition phase of sampling. The direction of the arrow represents a transmission direction of a signal in a phase.

Referring to FIG. 10A(1), in the data writing phase D1, in the pixel driving circuit 200, the scan transistor T2 is turned on in response to the scan signal Gate, so that the data signal Data is transmitted to the control electrode T1*c* of the driving transistor. The driving transistor T1 controls a magnitude of the driving current Id flowing through the driving transistor T1 according to a voltage of the control electrode T1*c*.

Referring to FIG. 10A(2), in the light-emitting phase D2, in the pixel driving circuit 200, the light-emitting control transistor T3 is turned on in response to the light-emitting control signal EM, so that the driving current Id flows through the light-emitting device EL, and the light-emitting device EL emits light. In the same phase, a voltage (i.e., the first voltage V1) of the second electrode T1*b* of the driving transistor is read by the first voltage follower 111 of the first voltage acquisition sub-circuit 110 and is stored in the first capacitor C1.

In this case, the display phase is completed, and the acquisition phase starts.

Referring to FIG. 10B(1), in the first phase S1, in the pixel driving circuit 200, the scan transistor T2 is turned on again in response to the scan signal Gate, so that the data signal Data is transmitted to the control electrode T1*c* of the driving transistor again. It will be noted that, in the first phase S1 of the acquisition phase, the data signal transmitted by the data signal terminal Data is the same as the data signal transmitted in the data writing phase D1. In the pixel driving circuit, the sensing transistor T4 is turned on in response to the sensing signal Sn. In the same phase, the second switching device SW2 of the first voltage acquisition sub-circuit 110, the first switching device SW1 of the current integrating sub-circuit 120, and the third switching device SW3 of the storage sub-circuit 134 are closed in response to the first control signal, the integral control signal and the third control signal, respectively, so that the first voltage V1 stored in the first capacitor C1 is transmitted to the storage sub-circuit 134 through the current integrating sub-circuit 120 and stored in the second capacitor C2.

Referring to FIG. 10B(2), in the second phase S2, the sensing transistor T4 is continuously on, so that the driving current Id flowing through the first electrode T1*a* to the second electrode T1*b* of the driving transistor is transmitted to the current integrating sub-circuit 120, and since the first switching device SW1 is continuously closed, the first voltage V1 stored in the first capacitor C1 can also be transmitted to the current integrating sub-circuit 120, so that the current integrating sub-circuit 120 generates and outputs the second voltage V2 according to the first voltage V1 and the integral of the driving current Id over time. In the same phase, the third switching device SW3 of the storage sub-circuit 134 is open, and the fourth switching device SW is closed in response to the fourth control signal, so that the second voltage V2 output by the current integrating sub-circuit 120 is transmitted to the storage sub-circuit 134 and stored in the third capacitor C3.

Referring to FIG. 10B(3), in the third phase S3, the second voltage follower 132 and the third voltage follower 133 in the differencing sub-circuit 130 read the first voltage V1 and the second voltage V2 from the second capacitor C2 and the third capacitor C3, respectively, the third voltage V3 is obtained by calculating the difference through the subtractor 131, and the third voltage is V3=Id*T/Cf That is, the third voltage V3 is a function of the driving current Id.

The display apparatus usually includes an analog-to-digital converter and a processor coupled to each other. The analog-to-digital converter is coupled to the sampling circuit, and is configured to receive the third voltage V3 output by the sampling circuit. The third voltage V3 may be converted into a digital signal through the analog-to-digital converter, the digital signal obtained by conversion is further transmitted to the processor for processing, and then a magnitude of the driving current Id' in the pixel driving circuit is obtained.

In the embodiments of the present disclosure, the third voltage V3 may be output through the pixel sampling circuit, and the third voltage V3 is a linear function of the driving current in the pixel driving circuit. Therefore, the third voltage V3 acquired through the pixel sampling circuit may be further used as a basis for calculating a compensation voltage of the pixel driving circuit. For example, the processor calculates the driving current Id' according to the third voltage V3, and calculates the compensation voltage according to the driving current Id'.

In some embodiments, referring to FIG. 7, the pixel driving circuit 200 further includes a voltage terminal ELVDD. The pixel driving circuit 200 is further configured to transmit a voltage of the voltage terminal ELVDD to the third input terminal Iput3 of the sampling circuit 100.

For example, the sampling circuit 100 reads the voltage (i.e., the fourth voltage V4) of the voltage terminal ELVDD through the fourth voltage follower 141, and stores the read fourth voltage V4 in the fourth capacitor C4. In addition, the sixth switching device SW6 is closed in the display phase in response to a sixth control signal, so as to output the fourth voltage V4 in the display phase.

The fourth voltage V4 output by the sampling circuit 100 is a real voltage of the first electrode T1*a* of the driving transistor in the pixel driving circuit 200 in the display phase. The fourth voltage V4 may also be further converted into a digital signal through the analog-to-digital converter, and the digital signal is transmitted to the processor of the display apparatus as a basis for calculating the compensation voltage, so that accuracy of calculating the compensation voltage is improved.

Figure 11:
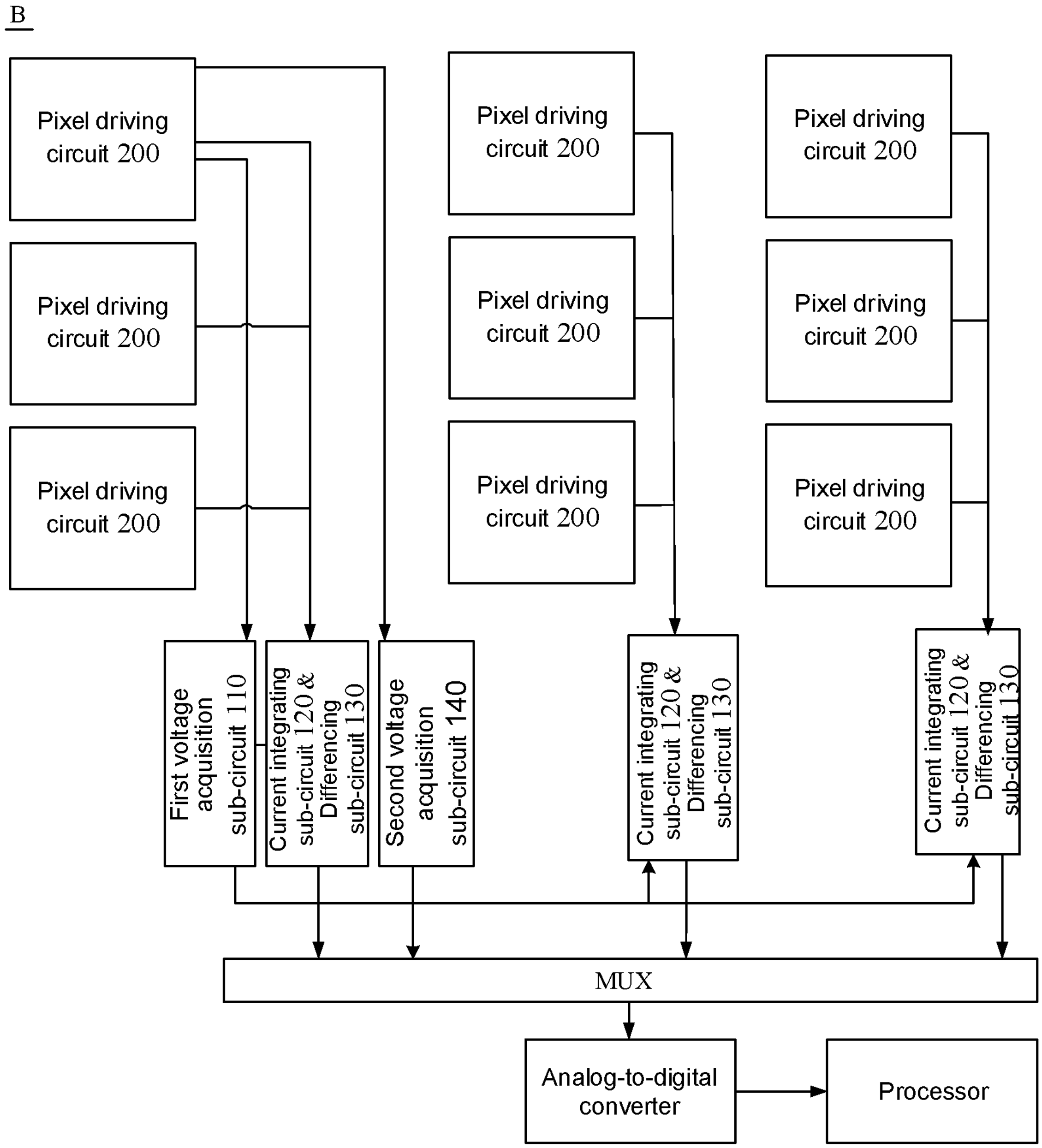
FIG. 11 is a structural diagram of yet another pixel sampling circuit, in accordance with some embodiments of the present disclosure.

In the display apparatus, the AA may be divided into a plurality of blocks (also referred to as sub-regions) B, and a block B may include multiple sub-pixels. Sub-pixels in a same block B may share one or several sampling circuits 100 (or sub-circuits in the sampling circuit(s)). For example, referring to FIG. 11, at least one (e.g., one) pixel driving circuit 200 in a block B is coupled to a single first voltage acquisition sub-circuit 110, and the first voltage acquisition sub-circuit 110 is configured to acquire the first voltage V1 from the pixel driving circuit 200, of the at least one sub-pixel, coupled to the first voltage acquisition sub-circuit 110, and the acquired first voltage V1 will serve as a reference voltage for all the current integrating sub-circuits 120 coupled to the sub-pixels in the block B. That is, all the current integrating sub-circuits 120 coupled to the sub-pixels in the block B output the second voltage V2 on a basis of the acquired first voltage V1. For another example, a column of sub-pixels in a block B is coupled to a single current integrating sub-circuit 120, and the current integrating sub-circuit 120 is configured to allow the driving current Id in the pixel driving circuits 200 of the column of sub-pixels to pass therethrough, and output the second voltage V2 according to the integral of the driving current Id over time.

For example, in a block B, a pixel driving circuit 200 of only a single sub-pixel is coupled to a first voltage acquisition sub-circuit 110, and a column of sub-pixels in the block B share a single current integrating sub-circuit 120. By controlling cascaded shift registers in the display panel, the single current integrating sub-circuit 120 may sequentially output a plurality of second voltages V2, and each second voltage V2 corresponds to an electrical signal acquired from the pixel driving circuit 200. In addition, for a same row of sub-pixels, a plurality of current integrating sub-circuits 120 simultaneously output pluralities of second voltages V2. For example, the pluralities of second voltages V2 may be sequentially transmitted to the analog-to-digital converter for processing through control of a multiplexer switch MUX.

In some embodiments, a block B may be provided with only a single second voltage acquisition sub-circuit 140, and the single second voltage acquisition sub-circuit 140 acquires the fourth voltage V4 from a single pixel driving circuit 200 in the block B. For the entire display apparatus, a plurality of fourth voltages V4 will be acquired. Then, the processor may further obtain an average value of the plurality of received fourth voltages V4 as a calculation basis for subsequent compensation voltages.

By dividing the sub-pixels in the display panel into blocks, and making the sub-pixels in the same block share one or several sampling circuits 100 (or sub-circuits in the sampling circuit(s)), a number of sampling circuits in the display apparatus may be greatly reduced, and in turn, it is conducive to a small size design of the display apparatus.

Figure 12:
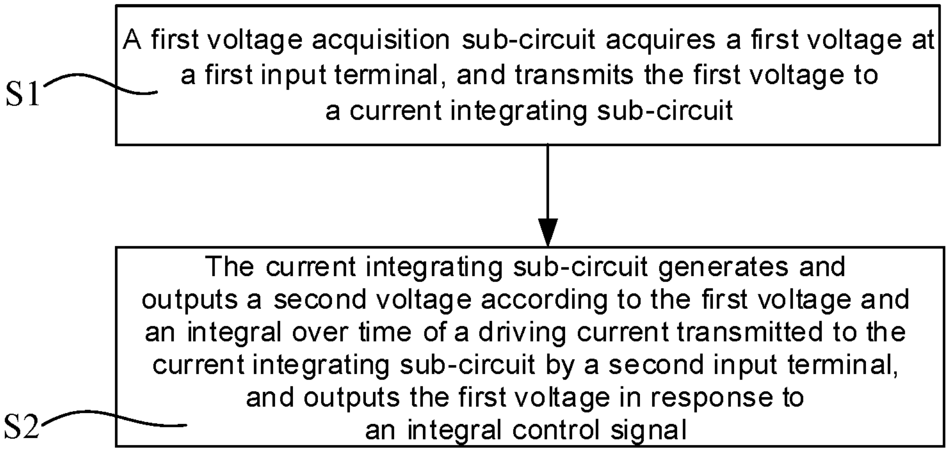
FIG. 12 is a flow diagram of a driving method of a sampling circuit, in accordance with some embodiments of the present disclosure.

The embodiments of the present disclosure further provide a driving method of a sampling circuit. Referring to FIG. 12, the driving method includes steps 1 and 2 (S1 and S2).

In S1, a first voltage acquisition sub-circuit acquires a first voltage of a first input terminal, and transmits the first voltage to a current integrating sub-circuit. For example, the first voltage acquisition sub-circuit acquires and stores the first voltage in a display phase, and transmits the first voltage to the current integrating sub-circuit in a first phase of an acquisition phase.

In S2, the current integrating sub-circuit generates and outputs a second voltage according to the first voltage and an integral of a driving current transmitted to the current integrating sub-circuit through a second input terminal over time; and the current integrating sub-circuit outputs the first voltage in response to an integral control signal. For example, the current integrating sub-circuit outputs the received first voltage in the first phase of the acquisition phase, and generates and outputs the second voltage according to the first voltage and the integral of the driving current over time in a second phase of the acquisition phase.

In some embodiments, the driving method further includes a step 3 (S3).

In S3, a differencing sub-circuit obtains a difference between the first voltage and the second voltage to obtain a third voltage. For example, the differencing sub-circuit obtains the difference between the first voltage and the second voltage in a third phase of the acquisition phase to obtain the third voltage, and outputs the third voltage.

In some embodiments, the driving method may further include:

- converting the first voltage and the second voltage that are output by the sampling circuit into digital signals by using an analog-to-digital converter; and
- calculating the driving current according to the converted first voltage and second voltage by using a processor.

In some embodiments, the driving method may further include:

- converting the third voltage output by the sampling circuit into a digital signal by using the analog-to-digital converter; and
- calculating the driving current according to the converted third voltage by using the processor.

In some embodiments, the driving method further includes: acquiring and outputting, by a second voltage acquisition sub-circuit, a fourth voltage provided by a third input terminal. For example, the second voltage acquisition sub-circuit acquires and outputs the fourth voltage in the display phase.

Each step in the driving method of the sampling circuit may be implemented with reference to the description of each sub-circuit in the sampling circuit, and will not be repeated here. Effects that can be achieved by the driving method of the sampling circuit are the same as effects that can be achieved by the sampling circuit, and will not be repeated here.

The foregoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A sampling circuit, comprising: a first input terminal, a second input terminal, a first voltage acquisition sub-circuit, a current integrating sub-circuit and a differencing sub-circuit, wherein

- the first voltage acquisition sub-circuit is coupled to the first input terminal and the current integrating sub-circuit, and is configured to acquire a first voltage of the first input terminal and transmit the first voltage to the current integrating sub-circuit;
- the current integrating sub-circuit is further coupled to the second input terminal, and is configured to, generate and output a second voltage according to the first voltage and an integral of a driving current transmitted to the current integrating sub-circuit through the second input terminal over time, and output the first voltage in response to an integral control signal received by the current integrating sub-circuit; and
- the differencing sub-circuit is coupled to the current integrating sub-circuit, and is configured to obtain a difference between the first voltage and the second voltage to obtain a third voltage, wherein the differencing sub-circuit includes:
  - a subtractor, the subtractor including a non-inverting input terminal, an inverting input terminal and an output terminal;
  - a second voltage follower, an input terminal of the second voltage follower being coupled to the current integrating sub-circuit, and an output terminal of the second voltage follower being coupled to the non-inverting input terminal of the subtractor; and
  - a third voltage follower, an input terminal of the third voltage follower being coupled to the current integrating sub-circuit, and an output terminal of the third voltage follower being coupled to the inverting input terminal of the subtractor.

2. The sampling circuit according to claim 1, wherein the second input terminal is configured to be coupled to the first input terminal.

3. The sampling circuit according to claim 1, wherein the first voltage acquisition sub-circuit includes:

- a first voltage follower, an input terminal of the first voltage follower being coupled to the first input terminal;

and/or the current integrating sub-circuit includes:

an integrator, the integrator including a non-inverting input terminal and an inverting input terminal, the non-inverting input terminal of the integrator being coupled to the first voltage acquisition sub-circuit, and the inverting input terminal of the integrator being coupled to the second input terminal; and a first switching device connected in parallel between the non-inverting input terminal of the integrator and the inverting input terminal of the integrator, the first switching device being configured to be closed in response to the received integral control signal.

4. The sampling circuit according to claim 3, wherein the first voltage acquisition sub-circuit further includes:

a first capacitor, a first electrode plate of the first capacitor being coupled to an output terminal of the first voltage follower, and a second electrode plate of the first capacitor being grounded; and a second switching device, the second switching device being coupled between the first electrode plate of the first capacitor and the current integrating sub-circuit.

5. The sampling circuit according to claim 1, wherein the current integrating sub-circuit includes a voltage output terminal, and the current integrating sub-circuit is configured to output the first voltage and the second voltage through the voltage output terminal; and the differencing sub-circuit further includes: a storage sub-circuit; the storage sub-circuit is coupled to the voltage output terminal of the current integrating sub-circuit, and is configured to, store the received first voltage in response to a third control signal received by the differencing sub-circuit, and store the second voltage in response to a fourth control signal received by the differencing sub-circuit.

6. The sampling circuit according to claim 5, wherein the storage sub-circuit includes:

a second capacitor, a second electrode plate of the second capacitor being grounded;

a third capacitor, a second electrode plate of the third capacitor being grounded;

a third switching device, the third switching device being coupled between the voltage output terminal and a first electrode plate of the second capacitor; and a fourth switching device, the fourth switching device being coupled between the voltage output terminal and a first electrode plate of the third capacitor.

7. The sampling circuit according to claim 1, further comprising:

a sampling output terminal; and a fifth switching device, the fifth switching device being coupled between the differencing sub-circuit and the sampling output terminal.

8. The sampling circuit according to claim 1, further comprising:

a third input terminal; and a second voltage acquisition sub-circuit coupled to the third input terminal, the second voltage acquisition sub-circuit being configured to acquire and output a fourth voltage provided by the third input terminal.

9. The sampling circuit according to claim 8, wherein the second voltage acquisition sub-circuit includes:

a fourth voltage follower, an input terminal of the fourth voltage follower being coupled to the third input terminal; and a fourth capacitor, a first electrode plate of the fourth capacitor being coupled to an output terminal of the fourth voltage follower, and a second electrode plate of the fourth capacitor being grounded.

10. The sampling circuit according to claim 9, further comprising:

a sampling output terminal, wherein the second voltage acquisition sub-circuit further includes a sixth switching device, and the sixth switching device is coupled between the first electrode plate of the fourth capacitor and the sampling output terminal.

11. A pixel sampling circuit, comprising:

the sampling circuit according to claim 1; and a pixel driving circuit, the pixel driving circuit including a driving transistor, and the driving transistor including a first electrode, a second electrode and a control electrode, wherein the pixel driving circuit is configured to, transmit a driving current flowing through the first electrode and the second electrode of the driving transistor to the second input terminal of the sampling circuit, and transmit a voltage of the second electrode of the driving transistor to the first input terminal of the sampling circuit.

12. The pixel sampling circuit according to claim 11, wherein the pixel driving circuit further includes at least one of:

a sensing transistor, wherein a control electrode of the sensing transistor is coupled to a scan signal terminal, a first electrode of the sensing transistor is coupled to the first input terminal, and a second electrode of the sensing transistor is coupled to the second input terminal; or a voltage terminal, wherein the pixel driving circuit is further configured to transmit a voltage of the voltage terminal to a third input terminal of the sampling circuit.

13. A display apparatus, comprising the sampling circuit according to claim 1.

14. The display apparatus according to claim 13, further comprising:

a processor coupled to the sampling circuit, the processor being configured to calculate the driving current according to a difference between the first voltage and the second voltage.

15. A display apparatus, comprising the pixel sampling circuit according to claim 11.

16. The display apparatus according to claim 15, further comprising:

a processor coupled to the pixel sampling circuit, the processor being configured to calculate the driving current according to a difference between the first voltage and the second voltage.

17. A driving method of a sampling circuit, the sampling circuit including: a first input terminal, a second input terminal, a first voltage acquisition sub-circuit, a current integrating sub-circuit and a differencing sub-circuit, wherein the first voltage acquisition sub-circuit is coupled to the first input terminal and the current integrating sub-circuit, the current integrating sub-circuit is further coupled to the second input terminal, and the differencing sub-circuit is coupled to the current integrating sub-circuit, wherein the differencing sub-circuit includes: a subtractor, the subtractor including a non-inverting input terminal, an inverting input terminal and an output terminal; a second voltage follower, an input terminal of the second voltage follower being coupled to the current integrating sub-circuit, and an output terminal of the second voltage follower being coupled to the non-inverting input terminal of the subtractor; and a third voltage follower, an input terminal of the third voltage follower being coupled to the current integrating sub-circuit, and an output terminal of the third voltage follower being coupled to the inverting input terminal of the subtractor; the driving method comprising:

acquiring, by the first voltage acquisition sub-circuit, a first voltage of the first input terminal, and transmitting, by the first voltage acquisition sub-circuit, the first voltage to the current integrating sub-circuit;

generating and outputting, by the current integrating sub-circuit, a second voltage according to the first voltage and an integral of a driving current transmitted to the current integrating sub-circuit through the second input terminal over time; and outputting, by the current integrating sub-circuit, the first voltage in response to an integral control signal received by the current integrating sub-circuit; and obtaining, by the differencing sub-circuit, a difference between the first voltage and the second voltage to obtain a third voltage, and outputting, by the differencing sub-circuit, the third voltage.

* * * * *